Feb. 17, 1970 | T. F. ARNOLD | 3,496,475

HIGH SPEED SHIFT REGISTER

Filed March 6, 1967 | 12 Sheets-Sheet 1

INVENTOR
T. F. ARNOLD
BY
Charles Scott Phelan
ATTORNEY

Feb. 17, 1970 T. F. ARNOLD 3,496,475

HIGH SPEED SHIFT REGISTER

Filed March 6, 1967 12 Sheets-Sheet 2

Feb. 17, 1970 T. F. ARNOLD 3,496,475

HIGH SPEED SHIFT REGISTER

Filed March 6, 1967 12 Sheets-Sheet 8

United States Patent Office 3,496,475

Patented Feb. 17, 1970

3,496,475
HIGH SPEED SHIFT REGISTER

Thomas F. Arnold, Plainfield, N.J., assignor to Bell Telephone Laboratories, Incorporated, Murray Hill and Berkeley Heights, N.J., a corporation of New York Filed Mar. 6, 1967, Ser. No. 621,052
Int. Cl. G11c *19/00*
U.S. Cl. 328—37 21 Claims

ABSTRACT OF THE DISCLOSURE

A shift register family is arranged to periodically reorganize an initial sequence of data into successive new sequences and to shift the data in selected ones of the resulting new sequences for speeding up long shift operations. Separate interstage paths are generally used for reorganizing the data and for shifting the data. In certain embodiments, the reorganization operation and the shift operation can be merged through the same interstage paths resulting in elimination of the separate paths for shifting.

TABLE OF CONTENTS

| | Column |
|---|---|
| (a) Background of the Invention | 1 |
| (1) Field of the Invention | 1 |
| (2) Description of the Prior Art | 1 |
| (b) Summary of the Invention | 2 |
| (c) Brief Description of the Drawings | 3 |
| (d) Detailed Description | 3 |
| (1) An *n* Stage Shift Register—One Reorganization Path and One Shift Path Per Stage (FIG. 1) | 3 |
| (2) A Seven-Stage Shift Register—One Reorganization Path and One Shift Path Per Stage (FIGS. 2–6) | 13 |
| (3) An *n* Stage Shift Register—One Reorganization Path and Two Shift Paths Per Stage (FIG. 8) | 21 |
| (4) Another *n* Stage Shift Register—One Reorganization Path and Two Shift Paths Per Stage (FIG. 10) | 35 |
| (5) An *n* Stage Shift Register—Two Reorganization Paths and One Shift Path Per Stage (FIGS. 11–15) | 41 |
| (e) Claims | 49 |

BACKGROUND OF THE INVENTION

Field of the invention

This invention is a high speed shift, or rotate, register circuit that is more particularly described as a rotate circuit using reorganization of data bits into predetermined sequences for speeding up long shift operations.

Description of the prior art

In the prior art, a conventional shift register has many relatively simple tandem stages, but it consumes a considerable amount of time completing a shift of data through a predetermined number of positions in the register. In such a conventional shift register, data bits are always stored in the same sequence, one bit per stage. Control circuits provide means to shift the data in that same sequence from stage to stage, one stage at a time, in response to shift pulses. The shift control circuits are relatively simple because they include only one interstage shift path per register stage if the register uses only forward shifting. The simplicity of the control circuits, however, causes the shift register to spend considerable time completing a long shift operation. For instance, to complete the longest possible shift, a forward shifting conventional shift register requires one system time slot, or a clock cycle, for each stage of the register.

Contemporary data processing systems are being designed to use conventional shift registers with so many stages that the systems must wait through undesirably long periods while shift operations are carried out. Because conventional shift registers generally use too much time for the most economical operation of data processing systems, efforts have been made to develop circuits to speed up shifting operations.

Also in the prior art, very complex shift registers have been developed to reduce the time required to complete long shift operations and thus improve overall efficiency of data processing systems. A system can only accomplish a theoretical maximum computation speed if each complete shift operation is accomplished in one system time slot. One method used to accomplish the theoretical maximum computation speed is through means of a register having enough interstage logic gating per stage to provide coupling directly from any selected stage to every other stage in the register. The interstage logic circuitry is sufficient to provide a path for each data bit to be transferred from wherever it had been stored prior to a shift pulse directly to its location at the end of a completed total shift operation in response to the shift pulse. A long shift register achieving the maximum computation speed therefore requires a very complex system of interstage logic gates.

Since previous development has achieved only relatively slow operation by means of simply constructed shift registers and relatively fast operation by means of complex shift registers, there is an existing need for a shift register that combines relatively fast operation with relatively simple control circuitry. Therefore, efforts have been made to develop shift register arrangements having just a few relatively simple interstage paths that conserve shift time by rapidly completing a shift along the stages of the register in a fraction of the time consumed by conventional shift registers.

SUMMARY OF THE INVENTION

An object of this invention is to reduce the time required to complete a shift operation in a long shift register having few interstage logic circuits per stage of the shift register.

Another object is to reduce the amount of interstage logic circuitry per stage in long shift registers designed to complete total shift operations faster than conventional forward shifting registers.

A further object is to develop a shift register that accomplishes successive shifts in accordance with a power series.

These and other objects of the invention are realized in a family of illustrative embodiments thereof in which few interstage paths per shift register stage and a small number of operations (clock cycles) are used to accomplish all possible shifts even in very long shift registers. Control circuits reorganize data bits from an initial sequence into successive new sequences each having an inherent shift span relative to the initial sequence. The data bits are periodically reorganized from sequence to sequence during time slots, or intervals, interposed between other intervals during which a set of shift pulses is applied. The successive sequences each have a shift span that is one of the successive terms of a power series. Additional control circuits produce shift pulse sets that shift data bits organized in selected ones of the sequences only as required to accomplish a desired total shift. Upon completion of a predetermined number of reorganization and shift operations, the data bits are organized into the initial sequence, but each bit is displaced by the desired number of register positions corresponding to the total shift.

A feature of the invention is a control circuit that periodically reorganizes an initial data sequence into new sequences in which a first cell $M_j$, storing a data bit that had been located in a cell $M_i$ prior to reorganization, is adjacent to a second cell $M_{j+1}$ (mod $n$), storing a data bit that had been located in cell $M_{i+Q}$ (mod $n$) prior to reorganization, wherein $i$ and $j$ are integers of a series of numbers, wherein Q is a constant representing a reorganization constant for each bit of the new data sequence, and wherein $n$ is the number of cells, or stages, in the register.

Another feature is that a shift span K increases in a power series relationship of the reorganization constant Q in successive sequences.

Another feature is the reuse of interstage reorganization circuits for performing successive steps in a power series shift operation.

A further feature is a control circuit that generates sets of shift pulses to shift data arranged in selected sequences having shift spans that increase in a power series.

BRIEF DESCRIPTION OF THE DRAWINGS

A better understanding of the invention may be derived from the detailed description following if that description is considered with respect to the attached drawings in which.

DETAILED DESCRIPTION

Figure 1:
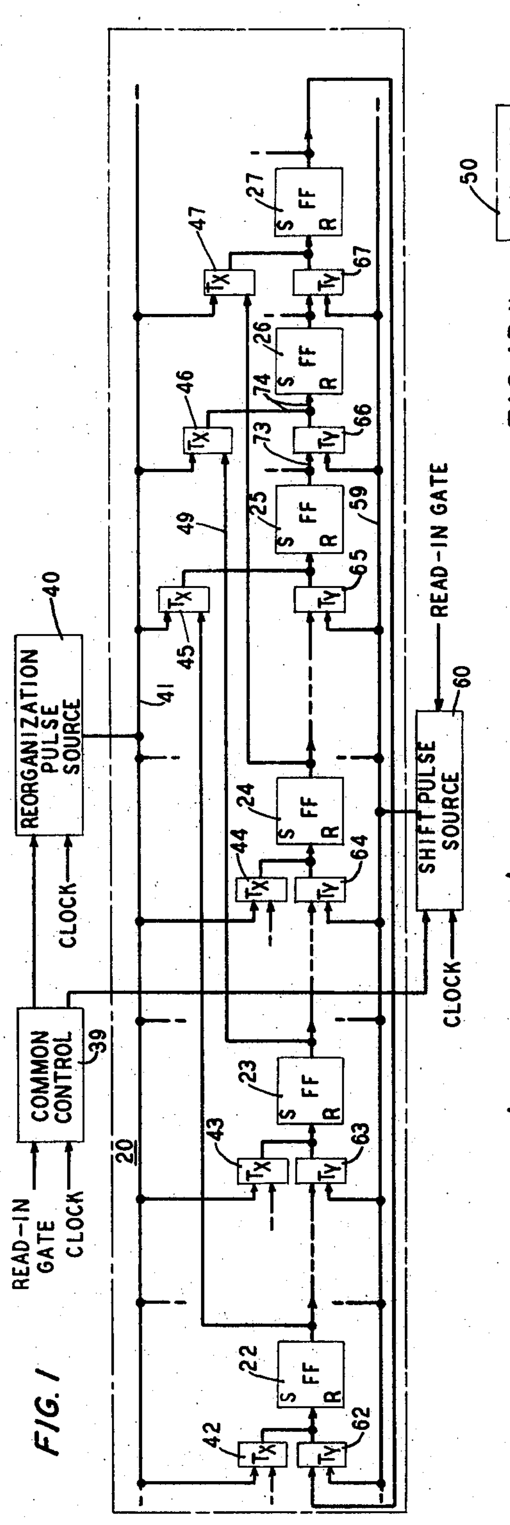
FIG. 1 is a block diagram of a first embodiment of a high speed shift register circuit having one reorganization path and one shift path per stage in accordance with the invention.

(1) An *n* stage shift register—One reorganization path and one shift path per stage Referring now to FIG. 1, there is shown a first embodiment of a high speed shift register 20 that reorganizes information bits into predetermined sequences to speed up long total shift operations. The shift register 20 includes a tandem array of *n* register stages arranged in a continuous ring. The *n* stages are shown illustratively as stages, or cells, 22, 23, 24, 25, 26, and 27, each of which stores a different bit of an original data sequence during intervals of a total shift operation. Dashed lines are shown interconnecting some of the stages to indicate that additional stages should be interposed where the dashed lines occur. Although in FIG. 1 only six cells of the register 20 are shown to illustrate the invention, greater benefits are derived from use of the invention in registers having many more than six cells.

The individual cells 22, 23, 24, 25, 26, and 27 are bistable memory devices that are constrained to assume either one of two stable states in response to bilevel input signals representing bits of binary data. One type of such cell is a bistable flip-flop circuit such as a circuit 30 shown in FIG. 1A. In the circuit 30, there are four NPN transistors 32, 33, 34, and 35 which are cross-coupled in an arrangement that produces complementary high and low level output signals at a "1" output 37 and a "0" output 38 depending upon the state of conduction of the transistors. The "1" output 37 is connected to the emitter electrode of the transistor 35, and the "0" output 38 is connected to the emitter electrode of the transistor 33. When the transistor 32 conducts, the transistors 33 and 34 are cut off so that a low level is produced at the "0" output 38; and the transistor 35 conducts so that a high level is produced at the "1" output 37. When the transistor 32 is cut off, the transistors 33 and 34 conduct so that a high level is produced at the "0" output 38; and the transistor 35 is cut off so that a low level is produced at the "1" output 37. Thus whenever the "1" output 37 has a high positive potential level, the "0" output 38 has a low positive potential level; and the circuit 30 is considered to be storing a binary digit "1." Conversely, when the "1" output 37 has a low potential level, the "0" output 38 has a high potential level; and the circuit 30 is considered to be storing a binary digit "0."

A set lead S and a reset lead R are used for constraining the circuit 30 to store a binary digit "1" or "0" in response to input signals representing a binary digit, or bit, of an initial data sequence. Complementary signals representing a bit are applied respectively to the set lead S and the reset lead R to establish an initial conduction state. Signals are applied to both the set lead S and the reset lead R because a high level is required to change the state of conduction and because a low level applied to either without a high level applied to the other is insufficient to change the state of conduction. When the applied complementary signals include a high level on the set lead S and a low level on the reset lead R, the transistors 32 and 35 conduct; and the transistors 33 and 34 are cut off. The "1" output 37 has a high potential level, and the "0" output 38 has a low potential level indicating that the circuit 30 is storing a binary "1." Conversely, when the applied complementary signals include a low level on the set lead S and a high level on the reset lead R, the transistors 33 and 34 conduct; and the transistors 32 and 35 are cut off. The "1" output 37 has a low potential level, and the "0" output has a high potential level indicating that the circuit 30 is storing a binary "0."

In FIG. 1 after an initial data bit has been stored in each cell by means of the set lead S and reset lead R of each cell, the data bits are transferred from one cell to another cell during transfer intervals, or clock cycles, in response to transfer signals applied to the register. These transfer signals are generated by two pulse sources respectively designated a reorganization pulse source 40 and a shift pulse source 60. The reorganization pulse source 40 and the shift pulse source 60 respond to signals from a common control circuit 39 and from a clock. The shift pulse source 60 is additionally responsive to read-in gate signals.

A first type of transfer signal is generated as reorganization pulses produced by the reorganization pulse source 40 which applies the reorganization pulses through a bus 41 simultaneously to reorganization gates 42, 43, 44, 45, 46, and 47 each associated with an input to a separate register cell. Although only six reorganization gates are shown in FIG. 1, it is to be understood that there is one and only one reorganization gate associated with an input to each cell of the shift register 20. Therefore dashed lines have been spaced along the bus 41 to indicate further connections between the bus 41 and reorganization gates for register cells not shown.

Each of the reorganization gates 42, 43, 44, 45, 46, 47, and additional reorganization gates not shown, is a gate circuit that constrains an individual cell to assume one or the other of its two stable states in response to concurrent application of binary input signals and a reorganization pulse. One type of reorganization gate, such as the gate 46 in FIG. 1, is a steering circuit 50 shown in FIG. 1B. The steering circuit 50 includes double-rail input leads $X_1$ and $X_0$ that are connected respectively to the "1" output and the "0" output of some cell in the shift register 20. A method to determine the cell to which the leads $X_1$ and $X_0$ are connected is to be described hereinafter. For the time being it is noted that a single line 49 in FIG. 1 represents a double-rail connection between the "1" and "0" outputs of the cell 23 and the $X_1$ and $X_0$ leads of gate 46.

Figure 1B:
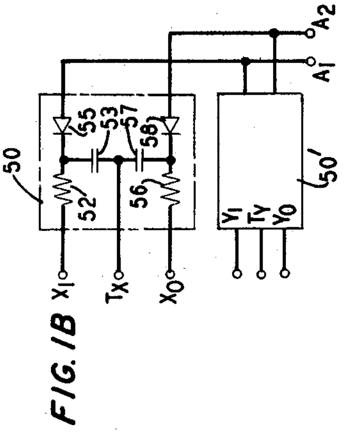
FIGS. 1A and 1B are schematic diagrams of a binary cell and an input gate arrangement used in various embodiments of the invention.

In FIG. 1B the lead $X_1$ is coupled through a resistor 52 and a capacitor 53 in series circuit to a timing terminal $T_X$ so designated to correspond with the leads $X_1$ and $X_0$. In FIG. 1 the bus 41 is shown connected to the terminals $T_X$ of each of the reorganization gates including the gate 46. Referring once again to FIG. 1B, a diode 55 couples a terminal $A_1$ to the junction between the resistor 52 and the capacitor 53 so that the cathode of the diode 55 is connected to the junction. The lead $X_0$ is coupled through a resistor 56 and a capacitor 57 in series circuit to the timing terminal $T_X$. A diode 58 couples a terminal $A_2$ to the junction between the resistor 56 and the capacitor 57 so that the cathode of the diode 58 is connected to that junction. The terminals $A_1$ and $A_2$ of FIG. 1B are to be connected respectively to similarly designated terminals $A_1$ and $A_2$ of the circuit 30 shown in FIG. 1A when the circuits of FIGS. 1A and 1B are to be used together in a shift register such as the shift register 20 of FIG. 1.

Figure 1A:
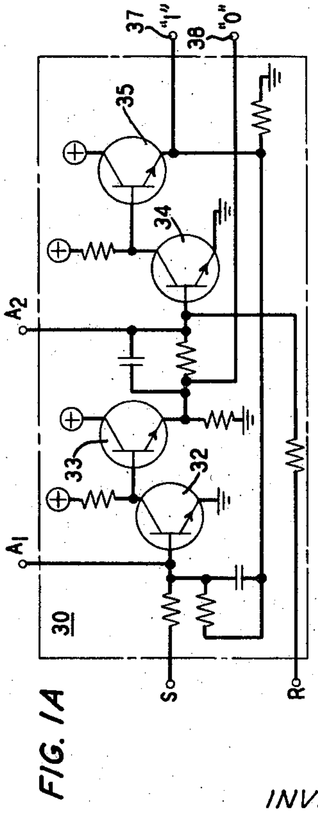

In FIG. 1A the terminals $A_1$ and $A_2$ are connected respectively to the base electrodes of the transistors 32 and 34 for applying input signals from the $X_1$ and $X_0$ leads to further control the conduction state of the circuit 30 after initial input signals are withdrawn from the set lead S and the reset lead R. When a reorganization pulse is applied over bus 41 of FIG. 1 to the terminals $T_X$ in FIG 1 and therefore also FIG. 1B, while complementary double-rail signals are applied to the leads $X_1$ and $X_0$, the circuit 50 constrains the circuit 30 of FIG. 1A to assume one or the other of its stable conduction states.

As an example, assume that the lead $X_1$ has a high level signal applied and the lead $X_0$ has a low level signal applied just prior to the application of a reorganization pulse to the terminal $T_X$. Additionally, assume that the transistors 32 and 35 are cut off and the transistors 33 and 34 are conducting so that the terminal $A_1$ is coupled to ground by a resistor in the emitter circuit of the cut-off transistor 35 and the terminal $A_2$ is coupled to ground through the base-emitter junction of the conducting transistor 34. Then the cathode of the diode 58 is held at a low near ground potential determined by a potential on the terminal $A_2$ and the low level on the lead $X_0$. The cathode of the diode 55 is held at a high potential level because the high level on the lead $X_1$ is coupled through the resistor 52. The diode 55 is therefore back-biased and cut off because of a relatively lower potential on the terminal $A_1$ than on the lead $X_1$.

Figure 5:
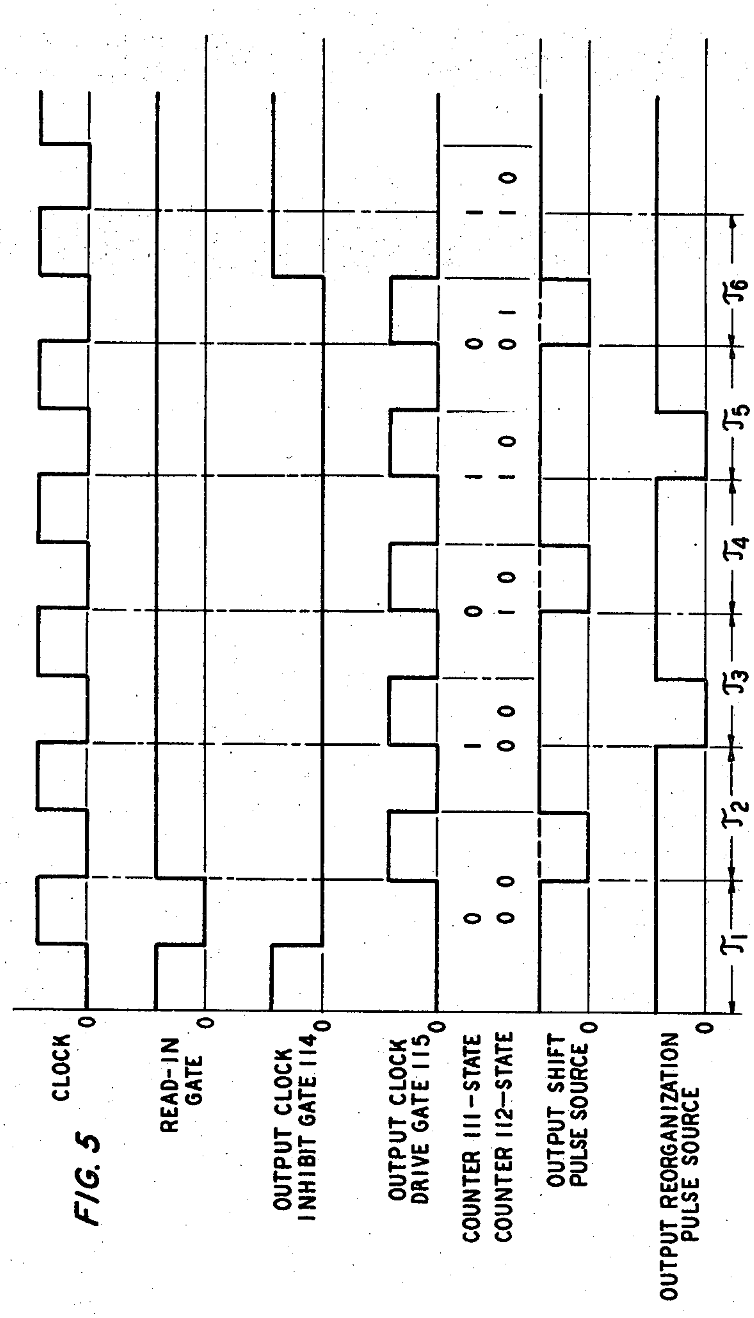
FIG. 5 is a timing diagram for the embodiment of FIGS. 2 and 3.

The reorganization pulse source 40 produces positive and zero potential levels separated by positive-going and negative-going transitions of which each negative-going edge is used to initiate reorganization operations. The output of the reorganization pulse source 40 is shown in FIG. 5. Although both positive-going and negative-going edges of pulses from the source 40 are coupled through the capacitors 53 and 57 of FIG. 1B to the cathodes of the diodes 55 and 58, only the negative-going edges are able to constrain the conduction state of the circuit 30. When the negative-going edge of each reorganization pulse is coupled through the capacitors 53 and 57 to the cathodes of the diodes, the diode 58 having a low signal applied from lead $X_0$ has its cathode potential forced to a negative value and therefore is biased to conduct. Thus the terminal $A_2$ and the base of transistor 34 are driven to a potential more negative than the reference potential, and the transistor 34 is cut off. Since the circuit 30 is arranged for alternative conduction either in the transistors 32 and 35 or in the transistors 33 and 34, the transistors 32 and 35 conduct; and the circuit 30 is considered to store a binary digit "1."

Conversely, the circuit 30 is constrained to store a binary "0" if a negative-going edge of a reorganization pulse is applied to the terminal $T_X$ while at a high level is applied to the lead $X_0$ and a low level is applied to the lead $X_1$.

In FIG. 1 the cells 22, 23, and 24 are each separated from one another by some constant number of cells to illustrate a transfer operation in the register 20 when a reorganization pulse occurs. The constant number of cells separating the cell 22 from the cell 23 and the cell 23 from the cell 24 determines how many positions these cells are displaced from each other. The number of positions that cell 23 is displaced from cell 22 and cell 23 from cell 24 is hereinafter referred to as a reorganization constant Q which can have any integer value such that $n$ and Q share no common integral divisor other than one.

A previously mentioned pattern for connecting the cells to the reorganization gates can be established by connecting the output of a first cell, such as cell 23, to the input of the reorganization gate 46, which is associated with the input to the cell 26. Thereafter, connect the output of a second cell 24 to the input of the reorganization gate 47 which is associated with the input to the cell 27. The cell 24 is in a position displaced from the first cell 23 by a number of positions equal to the reorganization constant Q. The cells 26 and 27 are in adjacent positions in the tandem array of register stages. This pattern should be followed until the output of each cell is connected to the input of one of the reorganization gates. Thus the output of each cell will be connected to the input of a separate reorganization gate, and the input of each reorganization gate will be connected to the output of a separate cell.

A reorganization operation can now be explained if we assume that all of the reorganization paths are connected, that each of the reorganization gates is connected to its associated cell, that data are stored in all of the cells, and that a reorganization pulse is applied over the bus 41 to the terminals $T_X$. Since we are concerned with a reorganization operation, we will concentrate on the data stored in cells 22, 23 and 24 and temporarily ignore the rest. A first bit stored in the cell 22 just prior to the reorganization pulse is now transferred by way of the gate 45 to the cell 25, a second bit stored in the cell 23 just prior to the reorganization pulse is now transferred by way of the gate 46 to the cell 26, and a third bit stored in cell 24 just prior to the reorganization pulse is now transferred by way of the gate 47 to the cell 27. In a similar manner each bit stored in the register 20 during an interval $\tau$ just prior to the reorganization pulse is transferred between cells to establish a new data sequence for the duration of the next interval $(\tau+1)$. In the new sequence each bit is again stored in a cell for the duration of the interval $(\tau+1)$. During the interval $(\tau+1)$, adjacent cells store bits that previously during the interval $\tau$ had been stored in cells displaced from each other by a number of register positions equal to the reorganization constant Q. Of course, bits stored in the right-hand stages just prior to the reorganization pulse are transferred around the ring to be reinserted from the left.

A second type of transfer signals is generated in sets of shift pulses by the shift pulse source 60 which applies the shift pulses through a bus 59, in FIG. 1, simultaneously to shift gates 62, 63, 64, 65, 66, and 67, each associated with an input to a separate register cell. Although six shift gates are shown in FIG. 1, it is to be understood that there is one and only one shift gate associated with an input to each cell of the shift register 20. Therefore dashed lines are extended from the bus 59 to indicate further connections between the bus 59 and shift gates for register cells not shown.

Each of the shift gates, 62, 63, 64, 65, 66, 67, and additional shift gates not shown, is a gate circuit that constrains an individual cell of the register 20 to assume one or the other of its two stable states in response to concurrent application of binary input signals and a shift pulse. One type of shift gate, such as the gate 66 in FIG. 1, is a steering circuit 50' of FIG. 1B. The steering circuit 50' is a duplicate of the steering circuit 50. The primed designation is used to distinguish the circuit 50' from the circuit 50. When the circuit 50' is connected in a register as shown in FIG. 1, the double-rail input leads $Y_1$ and $Y_0$ of the circuit 50' are connected respectively to the "1" output and the "0" output of an adjacent cell. A method to determine the cell to which the leads $Y_1$ and $Y_0$ are connected is to be described hereinafter. For the time being it is noted that a single line 73 in FIG. 1 represents a double-rail connection between the "1" and "0" outputs of cell 25 and the $Y_1$ and $Y_0$ leads of gate 66.

In FIG. 1B a timing terminal $T_Y$ is so designated to correspond with the leads $Y_1$ and $Y_0$ and in FIG. 1 the bus 59 is shown connected to the terminal $T_Y$ of each of the shift gates including the gate 66. Referring again to FIG. 1B, as previously mentioned the terminals $A_1$ and $A_2$ are connected respectively to the similarly designated terminals $A_1$ and $A_2$ of the circuit 30 shown in FIG. 1A so that the circuits 50, 50', and 30 respectively are used in FIG. 1 as the reorganization gate 46, the shift gate 66, and the register cell 26. In a similar manner there is a shift gate and a reorganization gate associated with each cell of the register 20.

A shift pulse, applied over bus 59 to the terminals $T_Y$ concurrently with complementary double-rail signals applied over the line 73, conditions the shift gate 66 to constrain the cell 26 to assume one or the other of its stable states. This is analogous to complementary signals applied over the leads $Y_1$ and $Y_0$ of FIG. 1B to constrain the circuit 30 of FIG. 1A to assume one or the other of its stable states in a shift operation that works similarly to a reorganization operation. The only difference is that shift pulses are appled to the timing terminals $T_Y$ rather than reorganization pulses as applied to the timing terminals $T_X$. Each shift pulse, however, is a negative-going transistion between high and low level signals similar to the reorganization pulse.

Assume that the circuits 50 and 50' of FIG. 1B are used in the register 20 of FIG. 1 for every reorganization gate and every shift gate and that the circuit 30 of FIG. 1A is used for every cell of the register 20. Each pair of the reorganization and shift gates in the register 20 has terminals $A_1$ and $A_2$ as shown for the circuits 50 and 50' of FIG. 1B. Both terminals $A_1$ and $A_2$ of each pair of reorganization and shift gates are connected respectively to the terminals $A_1$ and $A_2$ of the associated cell which is of the type shown in FIG. 1A. In FIG. 1 the connections of the reorganization gate 46 and the shift gate 66 through terminals $A_1$ and $A_2$ to the cell 26 are shown diagrammatically as lines 74. The leads $X_1$ and $X_0$ of the reorganization gate 46 are shown diagrammatically as the single line 49. The leads $Y_1$ and $Y_0$ to the shift gate 66 are also shown diagrammatically as the single line 73. In a similar manner the leads $X_1$ and $X_0$ to each reorganization gate and the leads $Y_1$ and $Y_0$ to each shift gate are shown as single lines in the shift register 20.

In FIG. 1 the cells 25, 26, and 27 are successive, or adjacent, stages of the register 20 separated only by the shift gates 66 and 67 to illustrate transfer operations that occur in response to each shift pulse. In following a previously mentioned pattern for connecting shift gates, it should be noted that the output of cell 25 is connected to the input of the shift gate 66 which is associated with the input to the cell 26 adjacent to cell 25, and the output of cell 26 is connected to the input of the shift gate 67 which is associated with the input to the cell 27 adjacent to cell 26. Similarly, the output of every cell is to be connected to the input of the shift gate associated with the input to the adjacent cell to the right, or in the forward direction of shifing.

A shift operation can now be explained if we assume that all of the shift paths are connected, a bit is stored in each of the cells, and a shift pulse is applied over the bus 59. Since we are concerned with a shift operation, we will concentrate on the bits stored in cells 25 and 26 and temporarily ignore the rest. The bit stored in cell 25 just prior to the shift pulse is transferred by way of the shift gate 66 to the cell 26, and the bit stored in cell 26 just prior to the shift pulse is transferred by way of the shift gate 67 to the cell 27. In a similar manner, each bit is shifted one cell to the right, or in the forward direction, in response to the shift pulse applied over the bus 59. Of course, the bit stored in the rightmost stage just prior to the shift pulse is shifted around the ring to the leftmost stage.

The maximum time in transfer intervals, or clock cycles, required to complete a total shift operation in the register 20 can be determined to be equal to $(Q)(1+[\log_Q n])$ intervals, or clock cycles, by considering the number of transfer intervals required for shift transfers performed on each new sequence of data together with the number of data sequences required for each total shift operation. A total shift operation is the repositioning of an initial data sequence a predetermined number of positions away from its initial position in the register. A total shift operation includes an interval for each transfer operation. It commences with entry of an initial data sequence and continues through all operations required for shifting the predetermined total number of register positions. The register 20 requires Q transfer intervals during the existence of each data sequence because $(Q-1)$ transfer intervals are required for shifting bits arranged in each sequence and one transfer interval is required for reorganizing the data into each sequence. During a total shift operation, the register 20 requires $(1+[\log_Q n])$ sequences of data to accomplish all possible total shift operations. The expression $[\log_Q n]$ numerically equals the largest integer smaller than the value of $\log_Q n$.

Since $(1+[\log_Q n])$ sequences of data are required to accomplish a total shift operation and Q transfer intervals are required for every sequence, there is a need for $(Q)$ $(1+[\log_Q n]$ transfer intervals, or clock cycles, during every total shift operation for completing the longest possible shift whenever it is to occur.

Now recalling that each reorganization operation does no more than establish a new sequence in the register, we shall consider that the entry of data into the register 20, that is the read-in operation, is a transfer operation storing the initial sequence of data in the register. With this consideration in mind, the intervals for the transfer operations occur in the following order: initial sequence interval, shift interval (or intervals), reorganization interval, shift interval, (or intervals), reorganization interval, shift inteval, (or intervals) until a number of intervals, or clock cycles, equal to $(Q)(1+[\log_Q n])$ have occurred.

As a result of entering the initial sequence and of performing each reorginization operation in the transfers just mentioned, a shift span K equal to some power of the reorganization constant Q is established in the register so that a shift pulse applied to the register during the designated intervals causes each bit of the data to shift in one shift interval, or clock cycle, through as many positions of the initial sequence as the existing shift span K. When the data are stored in the initial sequence, a shift span $K=Q^0=1$ exists between bits stored adjacently. For every shift pulse that occurs while the shift span $K=Q^0$ exists, each bit is effectively shifted $Q^0=1$, or one, position in the initial sequence. After a first reorganization pulse, a shift span $K=Q^1=Q$ exists between bits stored adjacently. For every shift pulse that occurs while the shift span $K=Q^1$ exists, each bit is effectively shifted $Q^1=Q$ positions in the initial sequence. A further reorganization pulse produces a shift span $K=Q^2=Q \cdot Q$ between bits stored adjacently. For every shift pulse that occurs while the shift span $K=Q^2$ exists, each bit is effectively shifted $Q^2=Q \cdot Q$ positions in the initial sequence. The shift span K increases in a power series of Q as a result of each subsequent reorganization transfer until $(Q)(1+[\log_Q n])$ intervals, or clock cycles, have elapsed, indicating that sufficient time has elapsed to complete the longest possible shift in the register. Therefore the data in the register can be read out, the register can be cleared, and another new sequence of data can be entered into the register to start another total shift operation.

Table I is included to show shift pulse sets for a series of desired total transfers for a shift register, similar to the register 20 of FIG. 1 but specifically arranged to have a reorganization constant $Q=2$. The reorganization constant $Q=2$ is obtained by connecting the reorganization gates and the cells as previously described.

number. So for example in a total shift of five positions we have a binary number 0101, and considering the binary number by position from right to left we find that shift pulses are applied during the intervals $\tau_2$ and $\tau_6$ when shift spans $K=Q^0=1$ and $K=Q^2=4$ exist because there are "1's" in the relevant positions of the binary number. Shift pulses are omitted during the intervals $\tau_4$ and $\tau_8$ when shift spans $K=Q^1=2$ and $K=Q^3=8$ exist because there are "0's" in the relevant positions of the binary number. By inspection of the Table I, it can be determined that the set of shift pulses for each desired total shift is directly related to the desired total shift expressed in positional notation of binary numerals.

The Table I is a general table that can be extended in width and in depth to include greater total shifts. The width and depth of Table I depend upon the number of cells $n$ in a particular register for which the Table I is prepared. The Table I must be wide enough to include a total shift of $(n-1)$ positions and must be deep enough to include an interval during which the shift span $K=Q[\log_Q n]$. The table can be cut off below the lowest row designated SEQUENCE where there is at least one shift pulse to be applied for a desired total shift.

Consider a hypothetical shift register having 215

TABLE I

[$n$ is an odd number $Q=2$]

| | Interval | Shift Span K | Desired Total Shift 0000 | 0001 | 0010 | 0011 | 0100 | 0101 | 0110 | 0111 | 1000 | 1001 |
|---|---|---|---|---|---|---|---|---|---|---|---|---|
| | | | 0 | 1 | 2 | 3 | 4 | 5 | 6 | 7 | 8 | 9 |
| Read In | $\tau_1$ | | 1 | 1 | 1 | 1 | 1 | 1 | 1 | 1 | 1 | 1 |
| Initial Sequence | $\tau_2$ | $Q^0=1$ | 0 | 1 | 0 | 1 | 0 | 1 | 0 | 1 | 0 | 1 |
| Reorganization | $\tau_3$ | | 1 | 1 | 1 | 1 | 1 | 1 | 1 | 1 | 1 | 1 |
| Sequence No. 2 | $\tau_4$ | $Q^1=2$ | 0 | 0 | 1 | 1 | 0 | 0 | 1 | 1 | 0 | 0 |
| Reorganization | $\tau_5$ | | 1 | 1 | 1 | 1 | 1 | 1 | 1 | 1 | 1 | 1 |
| Sequence No. 3 | $\tau_6$ | $Q^2=4$ | 0 | 0 | 0 | 0 | 1 | 1 | 1 | 1 | 0 | 0 |
| Reorganization | $\tau_7$ | | 1 | 1 | 1 | 1 | 1 | 1 | 1 | 1 | 1 | 1 |
| Sequence No. 4 | $\tau_8$ | $Q^3=8$ | 0 | 0 | 0 | 0 | 0 | 0 | 0 | 0 | 1 | 1 |

In Table I the left-hand column indicates an operation or significant relationship which occurs during the series of clock cycles, or intervals, shown in the second column. The third column indicates that the shift span K equals the reorganization constant Q raised to some power while successive bit sequences exist during intervals for shifting such as the intervals $\tau_2$, $\tau_4$, $\tau_6$, and $\tau_8$. Each shift span K indicates the number of positions data bits are effectively shifted in the initial sequence if a shift pulse is applied during the existence of the particular sequence. The series of columns under the caption "DESIRED TOTAL SHIFT" indicate first of all that a read-in operation occurs during the interval $\tau_1$ to commence every total shift operation. As described hereinafter in reference to FIGS. 2 and 3, the initial bit sequence is read into the cells of the register 20 in FIG. 1 in parallel through the set leads S and the reset leads R in response to the read-in pulse. Secondly, the columns indicate whether or not a reorganization pulse or a shift pulse is applied during each succeeding interval. Binary numbers and decimal numbers head each column to indicate the number of positions the data bits are to be shifted in the total shift. For example, a total shift of five is a five-stage shift in the $n$ stages of shift register 20 ($n$ being greater than 5).

In the columns under "DESIRED TOTAL SHIFT," the read-in row and the reorganization rows show a "1" for every possible desired total shift. This represents the fact that a read-in operation and a reorganization operation always occur during their designated intervals. The shift pulses occur in sets derived from the number of positions in the intial sequence through which the bits are to be shifted during the total shift operation. There is one set of shift pulses in each column. The shift pulse sets are derived from the positional notation of the binary numbers located at the head of each column. A shift pulse is applied when a "1" occurs in the binary number, and is omitted when a "0" occurs in the binary stages arranged for a reorganization constant $Q=2$ and storing an initial sequence of data to be shifted 93 positions. One interval $\tau_1$ has been required to shift that data into the register. The relevant "DESIRED TOTAL SHIFT" column of an expanded Table I would show a binary number 01011101 for the desired total shift of 93. Taking the binary number from right to left, we establish a shift pulse set having one shift pulse from the shift pulse source 60 during each of the intervals $\tau_2$, $\tau_6$, $\tau_8$, $\tau_{10}$, and $\tau_{14}$ and having no shift pulses from the shift pulse source 60 during the intervals $\tau_4$, $\tau_{12}$, and $\tau_{16}$. A reorganization pulse from the reorganization pulse source 40 is applied during each of the intervals $\tau_3$, $\tau_5$, $\tau_7$, $\tau_9$, $\tau_{11}$, $\tau_{13}$, and $\tau_{15}$. The entire shift operation of 93 stages in the 215 stage register requires only 16 intervals. In fact, any desired total shift within the 215 stages can be accomplished in the 16 intervals.

As soon as the last shift interval has expired in a total shift operation according to the Table I, the data in the shift register can be sorted and read out in parallel over output leads from the cells. Although the bits have been periodically reorganized into new sequences so that we might expect them to be jumbled by now, the reorganization operations are so uniform that we actually know exactly where to find any particular bit of the initial sequence after $(Q)(1+[\log_Q n])$ operations.

Tracing a bit through a total shift operation can be most easily followed by considering a desired total shift of zero positions. The data is read in and reorganization pulses are cyclically applied, but no shift pulses are applied during the total shift operation. Since no shift pulses are applied during the total shift operation, at the end of this operation we expect the data to be arranged in the initial sequence and in its original position. During the total shift operation each bit can be readily traced through the new sequences resulting from reorganization transfers until the last sequence occurs. The data in this last sequence would be stored in the cells so that the output leads from the cells need only be positionally arranged to place the bits into their original positions in the initial sequence. Thus, when $(Q)(1+[\log_Q n])$ intervals have occurred in any total shift operation the data on the output leads are in the proper position and need only be taken from the output leads to accomplish sorting.

After thus arranging the output leads for a specific register, those leads should be left as arranged. For other desired total shift operations of from one to $(n-1)$ positions, the bits are sorted into the initial sequence over the same output leads, but the data sequence is displaced by a number of register positions equal to the desired total shift without further sorting logic.

Table II is included to show a sequence of transfers for a shift register similar to the register 20 of FIG. 1 but arranged to have a reorganization constant $Q=3$. The reorganization constant $Q=3$ is obtained by connecting the reorganization gates and the cells as previously described. The outputs of cells located three positions from each other in the register are respectively connected to the inputs of reorganization gates associated with adjacent cells. For instance, in FIG. 1 if the reorganization constant $Q=3$, there are two stages between cells 22 and 23; and cells 25 and 26 are adjacent. The number of cells between cells 22 and 25 will be explained subsequently in the discussion of FIGS. 2 and 3. The output of each cell is also connected to the input of the shift gate associated with the cell adjacent.

position of the ternary number, there is no shift pulse from the shift pulse source 60 during the intervals $\tau_2$ and $\tau_3$. When a "1" occurs in the right-most position of the ternary number, there is one shift pulse from the shift pulse source 60 during the interval $\tau_2$ but no shift pulse during the interval $\tau_3$. When a "2" occurs in the right-most position of the ternary number, there are two shift pulses applied by the shift pulse source 60, one during each of the intervals $\tau_2$ and $\tau_3$. A similar analysis of the second position of the ternary number indicates whether 0, 1, or 2 shift pulses occur during the intervals $\tau_5$ and $\tau_6$.

So for example in a total shift of five positions we have a ternary number 012, and considering the ternary number from the right to left we find that shift pulses are applied during the two intervals $\tau_2$ and $\tau_3$ when the exists. No other shift pulse occurs during the existence of when the shift span $K=Q^1=3$ exists. No other shift pulse occurs during the existence of the shift span $K=Q^1=3$ in the interval $\tau_6$ nor during the existence of the shift span $K=Q^2=9$ in the interval $\tau_8$.

The Table II is general and can be extended in width and in depth to include greater total shifts. The Table II must be wide enough to include a total shift of $(n-1)$ positions, and must be deep enough to include an interval during which the shift span $K=Q^{[\log_Q]}$.

Consider now a hypothetical shift register having 415 stages arranged for a reorganization constant $Q=3$ and storing an initial sequence of data to be shifted 96 positions.

TABLE II

[$Q=3$]

| | Interval | Shift Span K | 000<br>0 | 001<br>1 | 002<br>2 | 010<br>3 | 011<br>4 | 012<br>5 | 020<br>6 | 021<br>7 | 022<br>8 | 100<br>9 |
|---|---|---|---|---|---|---|---|---|---|---|---|---|
| | | | Desired Total Shift | | | | | | | | | |
| Read In | $\tau_1$ | | 1 | 1 | 1 | 1 | 1 | 1 | 1 | 1 | 1 | 1 |
| Initial Sequence | $\tau_2$ | $Q^0=1$ | 0 | 1 | 1 | 0 | 1 | 1 | 0 | 1 | 1 | 0 |
| Do | $\tau_3$ | $Q^0=1$ | 0 | 0 | 1 | 0 | 0 | 1 | 0 | 0 | 1 | 0 |
| Reorganization | $\tau_4$ | | 1 | 1 | 1 | 1 | 1 | 1 | 1 | 1 | 1 | 1 |
| Sequence No. 2 | $\tau_5$ | $Q^1=3$ | 0 | 0 | 0 | 1 | 1 | 1 | 1 | 1 | 1 | 0 |
| Do | $\tau_6$ | $Q^1=3$ | 0 | 0 | 0 | 0 | 0 | 0 | 1 | 1 | 1 | 0 |
| Reorganization | $\tau_7$ | | 1 | 1 | 1 | 1 | 1 | 1 | 1 | 1 | 1 | 1 |
| Sequence No. 3 | $\tau_8$ | $Q^2=9$ | 0 | 0 | 0 | 0 | 0 | 0 | 0 | 0 | 0 | 1 |

In Table II the left-hand column indicates an operation or significant relationship which occurs during the series of clock cycles, or intervals, shown in the second column under the caption "INTERVAL." The column under the caption "SHIFT SPAN" indicates that the shift span K equals the reorganization constant Q raised to some power while each bit sequence exists during the intervals $\tau_2$, $\tau_3$, $\tau_5$, $\tau_6$, $\tau_8$. Each shift span K indicates the number of positions data bits are effectively shifted in the initial sequence if a shift pulse is applied during the existence of the particular sequence.

The series of columns under the caption "DESIRED TOTAL SHIFT" indicate that a read-in operation occurs during the interval $\tau_1$ to commence every total shift operation. As mentioned previously, the data bits are read into the register 20 in a manner to be described in reference to FIGS. 2 and 3. The columns also indicate that reorganization pulses from the reorganization pulse source 40 are periodically applied to the register 20 during every total shift operation. Decimal numbers and ternary numbers head each column to indicate respectively the number of positions the data bits are to be shifted and the occurrence of shift pulses in the shift pulse set required to accomplish each desired total shift.

The shift pulse sets are represented by the occurrence, a "1," or the nonoccurrence, a "0," of a shift pulse during selected intervals for any desired total shift. In Table II there are $(Q-1)=3-1=2$ intervals used for possible shift transfers during the existence of each sequence.

The set of shift pulses in each column is directly related to the ternary number representing the particular desired total shift. When a "0" occurs in the right-most tions. One interval $\tau_1$ was required to shift that initial sequence of data into the register. The relevant "DESIRED TOTAL SHIFT" column of an expanded Table II would show a ternary number 010120 for the desired total shift of 96. Taking the ternary number from right to left, we establish a shift pulse set having one shift pulse from the shift pulse source 60 during each of the intervals $\tau_5$ and $\tau_6$ when the shift span $K=Q^1=3$ exists. Additionally, one shift pulse occures during each of the intervals $\tau_8$ and $\tau_{14}$ when the respective shift spans $K=Q^2=9$ and $K=Q^4=81$ exists. No shift pulses occur during the existence of the shift spans $K=Q^0=0$, $K=Q^3=27$, and $K=Q^5=243$ during respective intervals $\tau_2$ and $\tau_3$, $\tau_{11}$ and $\tau_{12}$, and $\tau_{17}$ and $\tau_{18}$. Also there are no shift pulses during the intervals $\tau_9$ and $\tau_{15}$.

The entire shift operation of 96 stages requires only 18 intervals. In fact, any desired total shift within the 415 stages can be accomplished in the 18 intervals.

As soon as the last shift interval has expired in a total shift operation according to Table II, the data in the shift register can be sorted over leads similar to the leads described concerning Table I. Leads from the output of each stage are arranged to position the data into its initial sequence after the last transfer interval. This arrangement of leads is most easily accomplished for a shift of zero positions. Once the leads are correctly positioned, they are secured in position so that data are read out from the stages over the leads into their proper positions. Therefore a simple group of leads sorts the data into proper positions.

In an arrangement similar to the arrangement of Tables I and II, additional tables can be compiled for shift registers similar to the register 20 but having the reorganization constant Q equal to any integer greater than one. These additional tables can be readily developed by writing at the top of each column the desired total shift in decimal and Q-ary numbers. A read-in interval $\tau_1$ will indicate a "1" in each column under the caption "DESIRED TOTAL SHIFT." The "INITIAL SEQUENCE" must be shown in $(Q-1)$ intervals, or rows, designated $\tau_2, \tau_3 \ldots \tau_Q$. A reorganization interval $\tau_{Q+1}$ will indicate a "1" in each column under the caption "DESIRED TOTAL SHIFT." The "SEQUENCE NO. 2" is to be shown in $(Q-1)$ intervals $\tau_{Q+2} \ldots \tau_{2Q}$. The intervals are entered from top to bottom in the table until $(Q)(1+[\log_Q n])$ are shown.

The Q-ary number at the head of each column under the caption "DESIRED TOTAL SHIFT" indicates the shift pulses that are applied during the existence of each sequence. If a "0" occurs in the right-most position of the Q-ary number, no shift pulses occur during the existence of the initial sequence. If a "1" occurs in the right-most position of the Q-ary number, one shift pulse occurs during the existence of the initial sequence. If a "2" occurs in the right-most position of the Q-ary number, two shift pulses occur during the existence of the initial sequence. A similar analysis should be used to determine the number of shift pulses applied during the existence of a second sequence "SEQUENCE NO. 2" and of subsequent sequences.

Each sequence exists for $(Q-1)$ intervals before the sequence is reorganized so that there is sufficient time to apply shift pulses equal in number to the largest numeral of the Q-ary number system.

The shift pulse set for each possible total shift is the group of shift pulse occurrences and nonoccurrences shown in each column of the resulting table.

Figure 2:
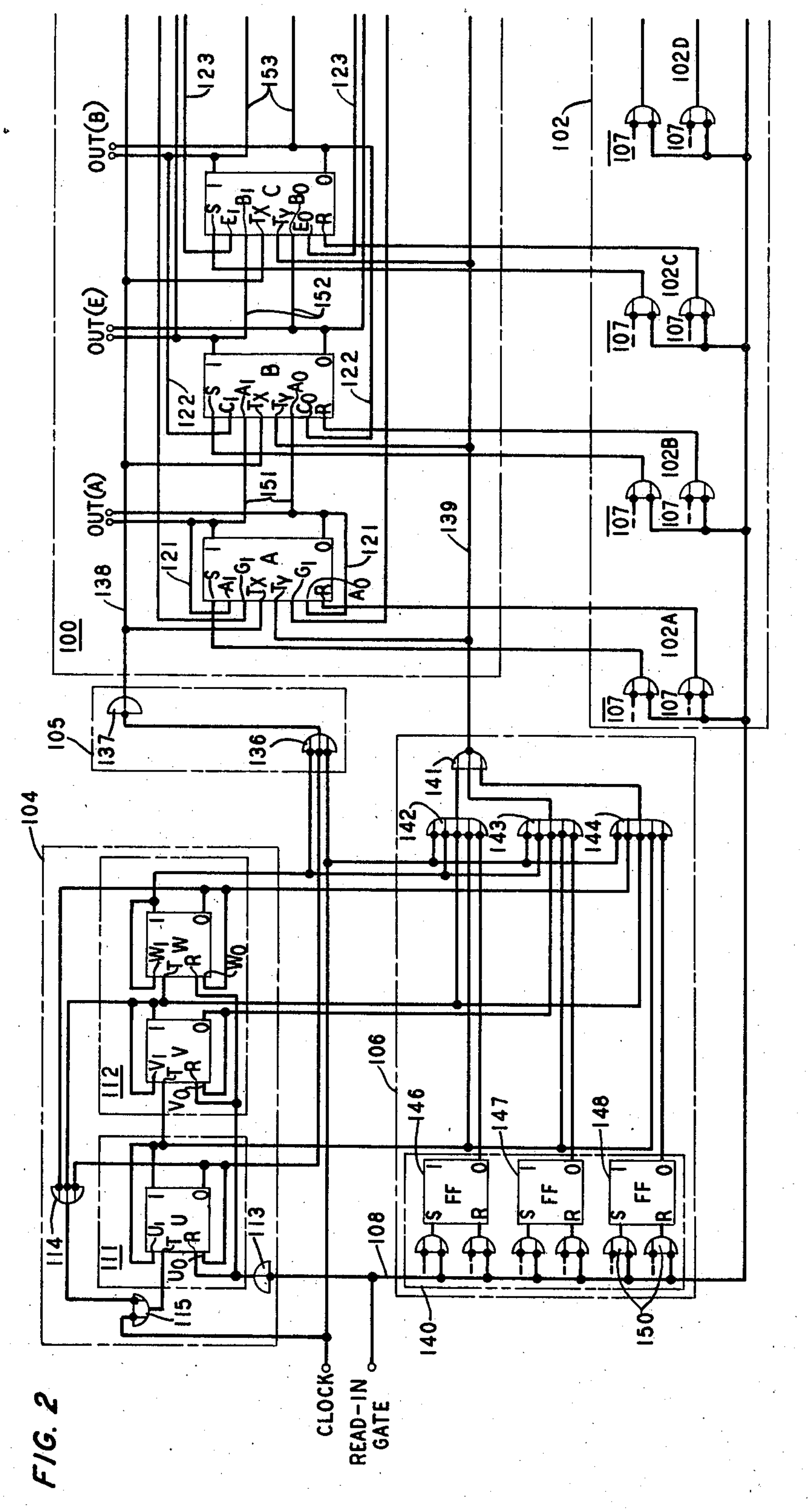
FIGS. 2 and 3 when positioned as shown in FIG. 4 are a schematic diagram of a seven stage shift register having one reorganization path and one shift path per stage in accordance with the invention.
Figure 4:
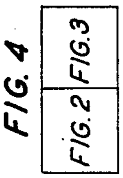
Figure 3:
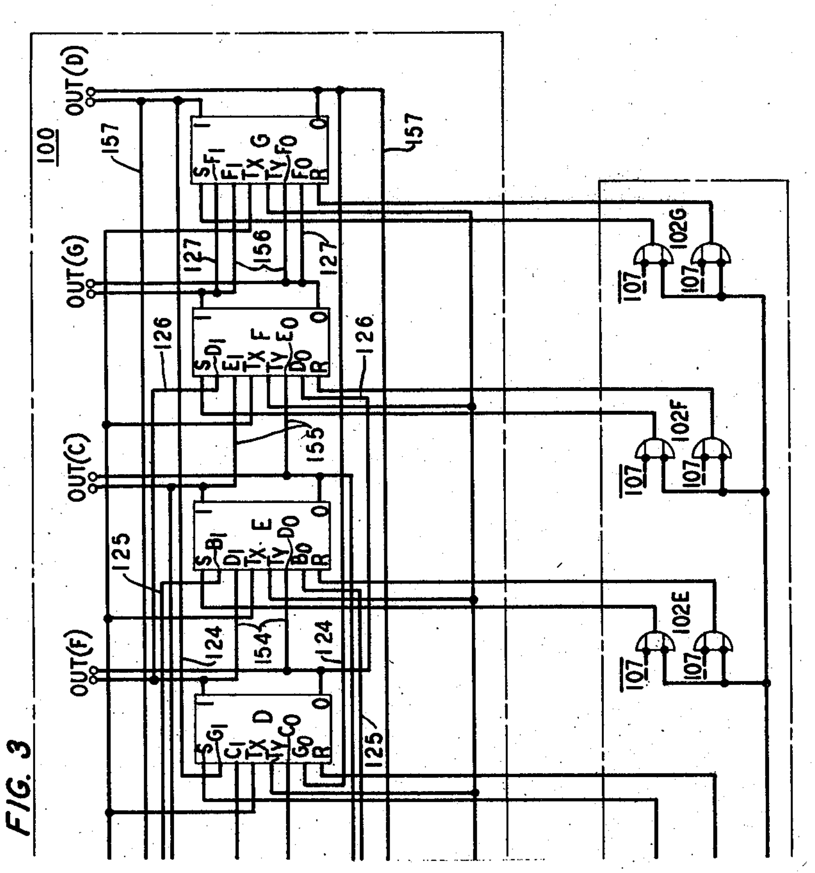

(2) A seven stage shift register—one reorganization path and one shift path per stage Referring now to FIGS. 2 and 3, which are to be positioned as shown in FIG. 4, there is shown an embodiment of a seven cell shift register 100 arranged in accordance with the principles of this invention. Since there are seven cells, $n$ equals seven. Reorganization paths are arranged so that the reorganization constant Q equals two. The shift register 100 is connected together with a parallel input circuit 102, a common control circuit 104, a reorganization pulse source 105, and a shift pulse source 106. The timing of operations of the embodiment shown in FIGS. 2 and 3 is presented in FIG. 5.

Figure 6:
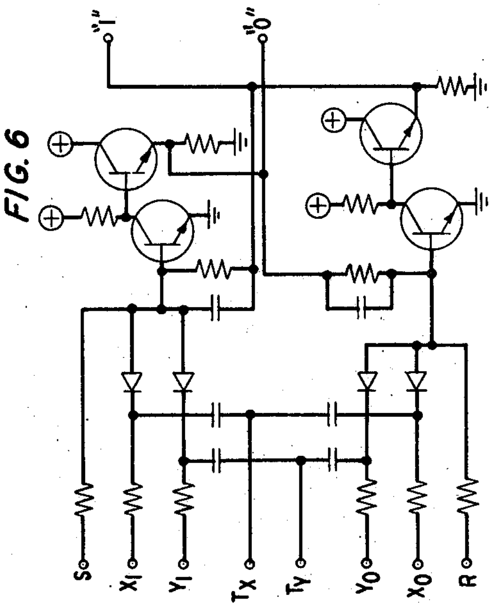
FIG. 6 is a schematic diagram of a binary cell having input gating arranged in accordance with cells used in the embodiment of FIGS. 2 and 3.

The shift register 100 includes cells A, B, C, D, E, F, and G, which are arranged for reorganization and shifting operations in accordance with the embodiment of FIG. 1. In FIGS. 2 and 3, for simplicity of the diagram, the cells A, B, C, D, E, F, and G each include a reorganization gate and a shift gate both of which were separately described in connection with FIG. 1. In FIGS. 2 and 3 those gates are considered to be included within the individual cells with only the input terminals to the gates and the output terminals of the cells distinctly designated. An arrangement of two gates included within a cell is shown in FIG. 6 where the gates and the bistable circuit are shown schematically to be similar to the combination of the circuits shown in FIGS. 1A and 1B. In the FIG. 6 the input terminals for the reorganization gate are designated $X_1$, $X_0$, and $T_X$, and the input terminals for the shift gate are designated $Y_1$, $Y_0$, and $T_Y$. In the embodiment of FIGS. 2 and 3, the $X_1$ and $X_0$ designations are replaced by the designations of the output terminals of the cell from which reorganization information is obtained. For instance, output terminals $C_1$ and $C_0$ of cell C are connected respectively to the input terminals $X_1$ and $X_0$ of cell B where the designations $C_1$ and $C_0$ are substituted for the $X_1$ and $X_0$ designations. Similar substitutions have been used for both the reorganization and shift input terminals to each cell of the register 100. The timing terminals $T_X$ and $T_Y$ are common to each cell. Reorganization pulses are applied to the timing terminals $T_X$, and shift pulses are applied to the timing terminals $T_Y$.

The register 100, the parallel input circuit 102, the common control circuit 104, the reorganization pulse source 105, and the shift pulse source 106 work together to complete a total shift operation upon an initial sequence of data entered into the register 100.

The parallel input circuit 102 of FIGS. 2 and 3 is only used for storing an initial sequence of data in the shift register 100. Before the shift register 100 commences a total shift operation, the initial sequence of data is applied to pairs of input leads 107 and $\overline{\mathbf{107}}$ to pairs of sequence gates 102A, 102B, 102C, 102D, 102E, 102F, and 102G. Complementary signals representing a binary number and its complement are applied to each pair of the input leads 107 and $\overline{\mathbf{107}}$. These complementary signals represent the initial sequence of data which is to be shifted into the cells A, B, C, D, E, F, and G all at once when a read-in gate pulse, shown during the latter half of an interval $\tau_1$ in FIG. 5, is applied by way of the read-in gate terminal and the lead 108 to the sequence gates 102A through 102G. Such a read-in gate terminal is indicated as an input to the common control circuit 39 and the shift pulse source 60 in FIG. 1. In FIGS. 2 and 3 each of the gates 102A through 102G produces a low level output at all times except when low level signals are applied to both inputs. When both inputs are low, the output is a high level. Whenever the read-in gate pulse is applied over the lead 108, one gate of each pair of the gates 102A through 102G is enabled. Each pair of gates thereby applies complementary signals to the leads S and R of each of the cells A, B, C, D, E, F, and G and each of the cells is constrained to store one bit of the initial sequence of data.

During each total shift operation, the common control circuit 104 provides timing information that is required for controlling the reorganization pulse source 105 and the shift pulse source 106. The common control circuit 104 includes a transfer operation counter 111, a sequence counter 112, and some gates. The counters 111 and 112 comprise a tandem sequence of bistable stages which are similar to the circuit of FIG. 6, but only a part of the inputs are used.

The transfer operation counter 111 is arranged to count the transfer operations that occur in connection with both the initial sequence and each reorganized sequenec of data in the register 100 during every total shift operation. As the counter 111 progresses counting transfer operations for each sequence, it furnishes data concerning its count state to the reorganization pulse source 105 and to the shift pulse source 106. The counter 111 commences counting clock pulses shown in FIG. 5 after the read-in gate pulse expires at the end of the interval $\tau_1$. In FIG. 2 the read-in pulse is inverted by an inverter gate 113 into a clear pulse that is used to reset the counters 111 and 112. After the read-in gate pulse expires, a timing terminal T of a stage U of the counter 111 receives a negative-going transition from a clock drive gate 115 every time the clock signal goes positive. The negative-going transition from the clock drive gate 115 triggers the stage U successively so that the counter 111 counts the clock pulses progressively until the counter 111 reaches a count equal to the total number of transfer operations required for the initial data sequence in the register 100 and then recycles upon receiving another negative-going transition as a result of the next clock pulse after the counter has reached full transfer count. Each time the transfer operation counter 111 recycles during a total shift operation, it commences counting clock pulses for a new sequence of data.

The full transfer count per sequence for a register, such as register 100, has previously been shown to equal the reorganization constant Q. Since the reorganization constant Q equals two for the register 100, the counter 111 has a full transfer count of two and therefore is a modulo two counter. A modulo two counter requires only one stage so the stage U is connected as a complementing flip-flop to count the transfer operations of each sequence. More stages would be required in the counter 111 if the reorganization constant Q were larger than two.

The sequence counter 112 is arranged to count the number of data sequences that occur during each total shift operation. The data sequences are the initial sequence and each new sequence resulting from subsequent reorganizations of the data. While the counter 112 progresses counting the sequences, it furnishes data concerning its count state to the reorganization pulse source 105 and to the shift pulse source 106. A timing terminal T of a first stage V of the counter 112 is connected to the output of the counter 111 so that the counter 112 responds to and counts the number of times the counter 111 recycles during each total shift operation. The stage V is triggered to count each time the stage U goes from its "1" count state to its "0" count state indicating that the counter 111 has recycled. The counter 112 counts the recycles of the counter 111 progressively until the counter 112 reaches a count equal to the total number of sequences required for the total shift operation in the register 100. The counter 112 supplies selected data concerning its full count of sequences to a clock inhibit gate 114 which is thereby conditioned to disable the clock drive gate 115 when the counter 112 has reached its full count of sequences.

The full sequence count per total shift operation for a register such as the register 100 has previously been shown to equal $(1+[\log_Q n])$. Since the reorganization constant Q equals two and $n$ equals seven for the register 100, the counter 112 has a full sequence count of $$(1+[\log_2 7])=(1+2)=3.$$

A binary counter of two stages V and W suffices to count to three and condition the clock inhibit gate 114 for disabling the clock drive gate 115. The clock inhibit gate 114 disables the clock drive gate 115 when the counters 111 and 112, respectively, have reached their full transfer and sequence count. The clock drive gate thereafter remains disabled until a read-in gate pulse, indicating a new initial sequence is to be stored in the register, causes the counters 111 and 112 to be reset.

The reorganization pulse source 105 is arranged to produce a reorganization pulse on a bus 138, which is like the bus 41 in FIG. 1, when the following conditions concur: (1) the counter 111 is at its full transfer count, (2) the counter 112 is not at its full sequence count, and (3) the clock signal is at a low level. A reorganization gate 136 has three inputs corresponding with the above conditions so that the gate 136 produces a positive potential pulse whenever the three stated conditions concur. An inverter 137 is included in the reorganization pulse source 105 so that the reorganization pulse applied to the bus 138 is a reference level signal interposed on an otherwise constant positive signal. The cells of the register 100, as previously described concering the embodiment of FIG. 1, respond only to the negative-going edge of each reorganization pulse. The timing of reorganization pulses for the embodiment of FIGS. 2 and 3 is shown in FIG. 5.

In the register 100, there are double-rail reorganization paths 121, 122, 123, 124, 125, 126, and 127 interconnecting the cells in accordance with a pattern that establishes the reorganization constant $Q=2$. The pattern is developed upon the basis that the output of each cell is to be connected by means of one double-rail path to the reorganzation gate input of some cell so that any two bits, stored two cells apart just prior to a reorganization pulse, are stored in adjacent cells after the reorganization pulse occurs. For convenience the pattern is started by connecting the outputs $A_1$ and $A_0$ of cell A by way of the double-rail path 121 to the reorganization gate inputs $A_1$ and $A_0$ of that same cell A. The outputs $C_1$ and $C_0$ of cell C, which is $Q=2$ positions from cell A, are connected by way of the double-rail path 122 to the reorganization gate inputs $C_1$ and $C_0$ of cell B, which is adjacent to cell A. The outputs $E_1$ and $E_0$ of cell $E_1$, which is $Q=2$ positions from cell C, are connected by way of the double-rail path 123 to the reorganization gate inputs $E_1$ and $E_0$ of cell $C_1$, which is adjacent to cell B. This pattern is continued until the outputs of each cell are connected individually by way of a double-rail path to the reorganization gate inputs $X_1$ and $X_0$ of some cell in the shift register 100.

Each time a reorganization pulse from the pulse source 105 makes a negative-going transition, the data stored in the register 100 is transferred through the paths 121, 122, 123, 124, 125, 126, and 127 and is thereby reorganized into a new data sequence in the cells.

The shift pulse source 106 is arranged to produce a set of shift pulses on a bus 139, which is like the bus 59 in FIG. 1, for each total shift operation. Shift pulses are to occur in each set of shift pulses when the following conditions concur: (1) each count state of the counter 111 before the counter 111 has reached its full transfer count, (2) each count state of the counter 112 before the counter 112 has reached its full sequence count, (3) each clock cycle at a predetermined level, and (4) a "1" is stored in a selected stage of a shift count register 140. A shift pulse gate 141 has three inputs that constrain the gate 141 to apply a uniform positive potential to the bus 139 except when the stated conditions occur. When the conditions occur, the shift pulse source 106 applies a reference level pulse to the bus 139. The cells of the register 100, as previously described, respond only to the negative-going edge of each of such shift pulses. The timing of shift pulses for the embodiment of FIGS. 2 and 3 is shown in FIG. 5.

The input signals to the shift pulse gate 141 are generated by shift set gates 142, 143, and 144. There is one shift set gate for each shift pulse that may occur during a total shift operation. Since three shift pulse intervals are required for the set of three shift pulses in each total shift operation, the three gates 142, 143, and 144 are used for this embodiment. Each of the gates 142, 143, and 144 is arranged to generate a constant positive signal except when one of the previously mentioned conditions, assigned to it, is satisfied. Input data is applied to each of the gates 142, 143, and 144 from the counter 111, the counter 112, the clock, and the shift count register 140.

The shift count register 140 includes three stages 146, 147, and 148 so that there is one stage associated with each of the gates 142, 143, and 144 for storing a bit of the total shift information for one of the three shift pulses of the set. The stages 146, 147, and 148 are bistable circuits that may be similar to the circuit of FIG. 6 wherein only the set and reset input leads are used. The number of positions through which the initial sequence of data is to be shifted is initially applied double-rail from a different part of a data processing system not shown to pairs of input leads to shift count gates, such as the gates 150 which drive the stage 148. When the read-in gate signal, shown in FIG. 5, goes to the reference level, the gates 150 store into the shift count register 140 the data corresponding to the number of positions the initial sequence of data in the shift register 100 is to be shifted (total shift). The number information is represented in binary code form because the reorganization constant $Q=2$. The stage 146 then stores a bit required to determine whether or not a shift pulse is to be applied to the bus 139 during one interval $\tau_2$ of the total shift operation. In a similar manner additional stages, such as 147, store information for subsequent intervals, and the stage 148 stores a bit required for the last interval during which a shift pulse may occur during the total shift operation.

In the register 100, there are double-rail shift paths 151, 152, 153, 154, 155, 156, and 157 interconnecting the output terminals of one cell to the input terminals $Y_1$ and $Y_0$ (shift gate) of an adjacent cell. In the ring configuration of the register 100, the right-most cell G is, of course, adjacent to the left-most cell A, and the shift path 157 interconnects those two cells.

Each time a shift pulse from the source 106 produces a negative-going transition on the bus 139, the data stored in the register 100 are transferred through the shift paths 151, 152, 153, 154, 155, 156, and 157 into adjacent cells. As a result of each transfer in response to a shift pulse, each data bit takes the initial sequence position of the data bit it replaced in the adjacent cell.

Before the shift register 100 commences operation, the shift register cells A through G, the control source 104, and the shift count register 140 may be storing information from a previous total shift operation. In addition, a new sequence of data is applied to the leads 107 and $\overline{\mathbf{107}}$, and the shift count data is applied to the input leads of the shift count gates such as the gates 150. Then, as shown in FIG. 5, a read-in gate pulse occurs during the first interval $\tau_1$. In response to the read-in gate pulse, the counters 111 and 112 are reset, the initial date sequence is stored in the cells A through G of the shift register 100, and the shift count data are stored in the shift count register 140. When the counters 111 and 112 are reset, the clock inhibit gate 114 is disabled, and its output signal is low. The low output from the clock inhibit gate 114 enables the clock drive gate 115 to respond to clock signals. Since the read-in gate pulse last through the remainder of the interval $\tau_1$, the counters 111 and 112 are still clear at the end of the interval $\tau_1$; and the initial data sequence is stored in its original order in the register cells.

When the interval $\tau_2$ commences, a shift span $K=Q^0=1$ exists for the initial data sequence stored in the register 100. A shift pulse may or may not be generated by the shift gate 141 depending upon the state of the shift set gate 142. The state of the output of the gate 142 normally is low, indicating that no shift pulse should be generated. The output signal of gate 142 changes from low to high indicating a shift pulse should be generated during the interval $\tau_2$ only if all of the input signals to the gate 142 are at a low level. The inputs to the gate 142 are all low when the counter 111 is in its "0" count state, the counter 112 is in its "0—0" count state, the clock signal is at a low level, and the stage 146 is storing a "1," indicating that a shift pulse is desired while the shift span of $K=Q^0=1$ exists. If the stage 146 stores a "0," no shift pulse occurs during the interval $\tau_2$.

Also during the interval $\tau_2$, the clock signal goes to a high level while the output of the clock inhibit gate 114 remains low. When the clock signal goes high, the output of the clock drive gate 115 makes a negative-going transition from high to low. This negative-going transition is applied to the timing terminal T of stage U in the counter 111 to trigger the counter 111 into its "1" count state.

When the interval $\tau_3$ commences, a reorganization pulse is generated by the source 105 because of the state of the inputs applied to the reorganization gate 136. The clock signal applied to the input of the gate 136 is a low level. The output terminal $U_0$ is at a low potential level, indicating that the counter 111 has reached its full transfer count. The output terminal $W_1$ is at a low potential level, indicating that the counter 112 has not reached its full sequence count. Therefore because the input signals applied to the reorganization gate 136 are all low, a reorganization pulse is applied over the bus 138 to the register 100, and the data stored in the register are reorganized into a new data sequence wherein the shift span $K=Q^1=2$ exists.

During the interval $\tau_3$ when the clock signal goes high, the output of the clock drive gate 115 makes a negative-going transition from high to low. This negative-going transition is applied to the timing terminal T of the stage U of the counter 111 to recycle the counter 111 into its "0" count state. when the signal on the output terminal $U_1$ changes from high to low as a result of recycling the counter 111, the negative-going transition of the signal on the output terminal $U_1$ is applied to the timing terminal T of stage V of the counter 112 to trigger the counter 112 into its "1–0" count state.

In the later intervals $\tau_4$ and $\tau_6$, the shift pulse source 106 will generate shift pulses respectively if the stages 147 and 148 of the shift count register 140 both store a "1." No shift pulse occurs during the interval $\tau_4$ if the stage 147 stores a "0," and no shift pulse occurs during the interval $\tau_6$ if the stage 148 stores a "0."

In the interval $\tau_5$, the reorganization pulse source 105 produces another reorganization pulse which is applied to the bus 138. Once again the data stored in the register is reorganized over the double-rail reorganization paths 121 through 127 into another new data sequence wherein the shift span $K=Q^2=4$ exists.

During the interval $\tau_6$, the counters 111 and 112, respectively, reach their full transfer and sequence count. The inputs to the clock inhibit gate 114 are arranged to enable that gate when the counters 111 and 112 both reach their full count. When the clock inhibit gate 114 is enabled, it produces a high output as shown during the interval $\tau_6$ in FIG. 5. As soon as the output of the clock inhibit gate 114 goes high, the clock drive gate 115 is disabled, and no more clock pulses are applied to the counter 111 until after another read-in gate pulse is applied to the read-in gate terminal, indicating that another total shift operation is to be commenced.

Transfer operations that are performed on the initial sequence of data stored in the shift register 100 are carried out in response to signals generated in accordance with a Table III and the timing diagram of FIG. 5 by the reorganization pulse source 105 and the shift pulse source 106.

TABLE III

[$Q=2$ $n=7$]

| | Interval | Shift Span | Desired Total Shift 000 / 0 | 001 / 1 | 010 / 2 | 011 / 3 | 100 / 4 | 101 / 5 | 110 / 6 |
|---|---|---|---|---|---|---|---|---|---|
| Read In | $\tau_1$ | | 1 | 1 | 1 | 1 | 1 | 1 | 1 |
| Initial Sequence | $\tau_2$ | $Q^0=1$ | 0 | 1 | 0 | 1 | 0 | 1 | 0 |
| Reorganization | $\tau_3$ | | 1 | 1 | 1 | 1 | 1 | 1 | 1 |
| Sequence No. 2 | $\tau_4$ | $Q^1=2$ | 0 | 0 | 1 | 1 | 0 | 0 | 1 |
| Reorganization | $\tau_5$ | | 1 | 1 | 1 | 1 | 1 | 1 | 1 |
| Sequence No. 3 | $\tau_6$ | $Q^2=4$ | 0 | 0 | 0 | 0 | 1 | 1 | 1 |

The salient characteristics of the Table III and the timing diagram of FIG. 5 are that a read-in gate signal occurs during the interval $\tau_1$ no matter what total shift is desired and that reorganization pulses occur during the intervals $\tau_3$ and $\tau_5$ no matter what total shift is desired. A shift pulse when applied to the register 100 during the interval $\tau_2$ will effectively shift all bits one position relative to the initial sequence, that is, through a shift span $K=Q^0=1$. Shift pulses when applied during the intervals $\tau_4$ and $\tau_6$ respectively shift data two and four positions relative to the initial sequence. One shift pulse applied while a particular sequence and shift span K exists will effectively shift the bits through the existing shift span K because in each case the bits are shifted to adjacent stages where they each take the place of another bit of the initial sequence. Output leads OUT(A)–OUT(G) should be arranged alphabetically. When the bits are sorted through the leads OUT(A)–OUT(G) at the end of the desired total shift, the bits are arranged in the initial sequence and are displaced with the desired number of positions.

Because the reorganization constant $Q=2$, the sets of shift pulses shown in Table III are determined by the binary representation of each desired total shift as previously described. For each possible total shift, it is necessary to perform all the indicated transfers and to provide all of the intervals so that the data is sorted out in its initial sequence at the finish. Therefore, when the desired total shift is one position, the shift pulse set includes a shift pulse applied during the interval $\tau_2$ while the shift span $K=Q^0=1$ exists, but no shift pulses occur during the intervals $\tau_4$ and $\tau_6$. Likewise, when the desired total shift is five positions, the shift pulse set includes one shift pulse applied during each of the intervals $\tau_2$ and $\tau_6$, but no shift pulse during the interval $\tau_4$. Other shift pulse sets can be determined from the remaining columns of Table III.

In FIG. 5 the shift signal is a constant positive level except when a shift pulse occurs. When the shift pulse occurs, the shift signal makes a negative-going transition which is indicated as a "1" in Table III. Dashed lines are shown for the shift signal during the intervals $\tau_2$, $\tau_4$, and $\tau_6$ to indicate there is no shift pulse when a "0" is shown in Table III.

Figure 7:
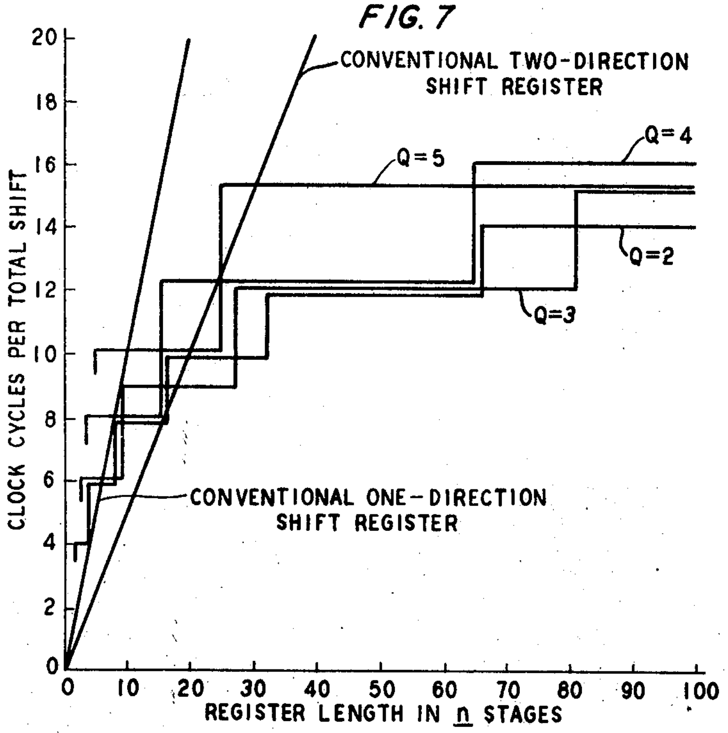
FIG. 7 is a graph showing the relative performance of shift registers arranged in accordance with the embodiment of FIG. 1 and conventional shift registers.

Although six intervals, or clock cycles, are required to complete a total shift operation in the shift register 100, the seven stage register is considered to be only illustrative of the principles of the invention. It has been found that a much more favorable ratio of clock cycles, or transfer intervals required to complete a total shift operation, to register stages exists for shift registers having more than seven stages. As the shift register length increases in the number of stages, such ratio becomes more and more favorable. An indication of the relative performance of shift registers, arranged to have selected reorganization constants as indicated, and conventional one-direction and two-direction shift registers is shown in the graph of FIG. 7 for ready comparison of this invention with the prior art. The graph clearly shows that for long shift registers fewer clock cycles are required to perform almost any total shift in a register arranged to reorganize the data, in accordance with the reorganization constants shown, than are required for either type of conventional shift register.

Certain modifications must be made in the previously described common control circuit 104 and the shift pulse source 106 when they are used in conjunction with shift registers similar to the shift register 100 except for having more than seven cells. In the common control circuit 104, additional stages would be included in the counter 112 to increase its full sequence count to an appropriate number equal to $(1+[\log_Q n])$. In the shift pulse source 106, additional stages would be included in the shift count register 140, and they would be associated with additional shift set gates so that one shift count register stage and one shift set gate are available for initiating a shift pulse during each interval a shift pulse may be required.

Certain other modifications are required in the common control circuit 104 and in the shift pulse source 106 for shift registers having a reorganization constant Q greater than two. In the common control circuit 104, additional stages would be included in the counter 111 to increase its full transfer count to equal Q. For each sequence of data in a total shift operation there would be two transfer intervals for shift pulses if the reorganization constant $Q=3$, three transfer intervals for shift pulses if the reorganization constant $Q=4$, etc. One shift pulse or no shift pulse would occur in each transfer interval per sequence. For a shift register having a reorganization constant $Q=3$, there would be two combinations of a shift set stage associated with a shift set gate in the shift pulse source 106 for each sequence existing during a total shift operation. A shift register having a reorganization constant $Q=4$ would similarly have three combinations of a shift set stage associated with a shift set gate in the shift pulse source 106 for each sequence existing during a total shift operation. Each of such combinations for the reorganization constants $Q=3$ and $Q=4$ would include one shift set stage, such as the shift set stage 146, and one shift set gate, such as the shift set gate 142, of the embodiment of FIGS. 2 and 3.

The shift count may advantageously be supplied to such a shift count register in signals derived from Q-ary numbers having the reorganization constant Q as a base. The Q-ary numbers are to be used to express the shift count desired. A truth table providing essential timing and logic for any shift register having $n$ stages and $a$ selected reorganization constant Q can readily be arranged in the form of Tables I and II. The $n$ and the Q for any particular register cannot have a common integral divisor other than one as previously stated. Such a truth table will provide essential information required for converting the shift count in Q-ary numbers to binary signals used in the logic of producing shift pulse sets and reorganization pulses as described in regard to the embodiment of FIGS. 2 and 3.

A shift register arranged in a continuous ring like the shift register 100 is a system in which a finite, or closed, set of integers can be used repeatedly in a cyclical manner for designating related elements. In such a closed set of integers, the number of distinct integers is called a modulus. In a modulus system of integers, all numbers are expressed as integers less than or equal to the modulus. In modulus arithmetic performed on such a closed set of integers, the results of operations are also expressed as integers less than or equal to the modulus. Thus in a modulus 12 system $$32=8(\text{mod } 12)$$

Since the modulus is 12, all numbers including 32, are expressed in integers less than 12. This is accomplished in a manner similar to keeping time on a clock face. A number of greater than the modulus can be properly expressed by dividing the number by the modulus. The remainder is the proper integer for expressing the greater number. Thus, $32\div 12=2$ with a remainder of 8. Therefore $$32=8(\text{mod } 12)$$

Since the shift register 100 is an ordered set of $n$ binary cells, a closed set of integers having a modulus $n$ can be used to represent elements of the register and its operation. Before each transfer operation, the $n$ cells are to be designated as a set of integers $(M_i(\tau)$ where $i=0, 1, 2 \ldots (n-1)$. After each transfer operation, the $n$ cells are to be designated as another set of integers $M_j^i(\tau+1)(\text{mod } n)$ where $i=0, 1, 2 \ldots (n-1)$ and $j=0, 1, 2 \ldots (n-1)$. Each $j$ designates a cell where a particular bit is stored after the transfer operation, and each $i$ designates the cell where that particular bit was stored before the transfer operation.

In the previously described shift operation, which transfers each bit from the cell where it was stored during an interval $\tau$ to a next adjacent cell in the ring for the next interval $(\tau+1)$, the following set of integers results as designations for the sequence of cells after the operation:

$$M_j^i(\tau+1)(\text{mod } n);\ M_{j+1}^{i+1}(\tau+1)(\text{mod } n);$$
$$M_{j+2}^{i+2}(\tau+1)(\text{mod } n);\ \ldots\ M_{j+n-1}^{i+n-1}(\tau+1)(\text{mod } n)$$

The (mod $n$) applies to both the $i$ and $j$ terms of the set, and each $j$ is equal to $(i+1)$. Such a shift operation occurs in the shift register 100 every time a shift pulse is produced by the shift pulse source 106.

In the previously described reorganization operation, each bit is transferred from the cell where it was stored during an interval $\tau$ to another cell in the ring for the next interval $(\tau+1)$ such that a new data sequence occurs. Such a reorganization operation results in the following set of integers as designations for the sequence of cells after the operation:

$$M_j^i(\tau+1)(\text{mod } n);\ M_{j+1}^{i+Q}(\tau+1)(\text{mod } n);$$
$$M_{j+2}^{i+2Q}(\tau+1)(\text{mod } n);\ \ldots\ M_{j+n-1}^{i+(n-1)Q}(\tau+1)(\text{mod } n)$$

The (mod $n$) applies to both the $i$ and the $j$ terms of the set. This reorganization operation occurs in the shift register 100 every time a reorganization pulse is produced by the reorganization pulse source 105.

As previously mentioned, successive reorganization operations by means of the reorganization paths will produce successive new and different sequences of data stored in the cells of the register 100. As written in terms of $M_i$ where each bit is represented by the position of the cell where the bit was stored in the initial sequence, the successive patterns occurring in a total shift operation to shift the initial data sequence zero positions would appear during the intervals $\tau_2$, $\tau_4$, and $\tau_6$ as follows in Table IV.

TABLE IV

| Interval | Register Cells $M_i$ | | | | | | |
|---|---|---|---|---|---|---|---|
| | A or 0 | B or 1 | C or 2 | D or 3 | E or 4 | F or 5 | G or 6 |
| $\tau_2$ | $M_0$ | $M_1$ | $M_2$ | $M_3$ | $M_4$ | $M_5$ | $M_6$ |
| $\tau_4$ | $M_0$ | $M_2$ | $M_4$ | $M_6$ | $M_1$ | $M_3$ | $M_5$ |
| $\tau_6$ | $M_0$ | $M_4$ | $M_1$ | $M_5$ | $M_2$ | $M_6$ | $M_3$ |

In Table IV the individual shift register cells are represented by the squares within the rows. Each row represents all of the cells in the register during one of the selected intervals $\tau_2$, $\tau_4$, and $\tau_6$. Of course, in this table the shift gates and the reorganization gates have been omitted for clarity. During each selected interval each cell is designated by the bit of the original data sequence stored within the cell for the interval. In view of Table IV and as previously stated, the bits of the original data sequence can be readily traced through the successive sequences resulting from the reorganization operations. Once the output leads are arranged to sort the bits organized in the last sequence stored during the interval $\tau_6$, any total shift operation can be performed because any shift pulses interspersed between the reorganization pulses will not upset the final order of the digits in the register 100.

Figure 8A:
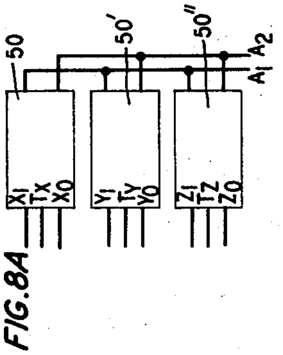
FIG. 8A is a block diagram of an input gate arrangement.
Figure 8:
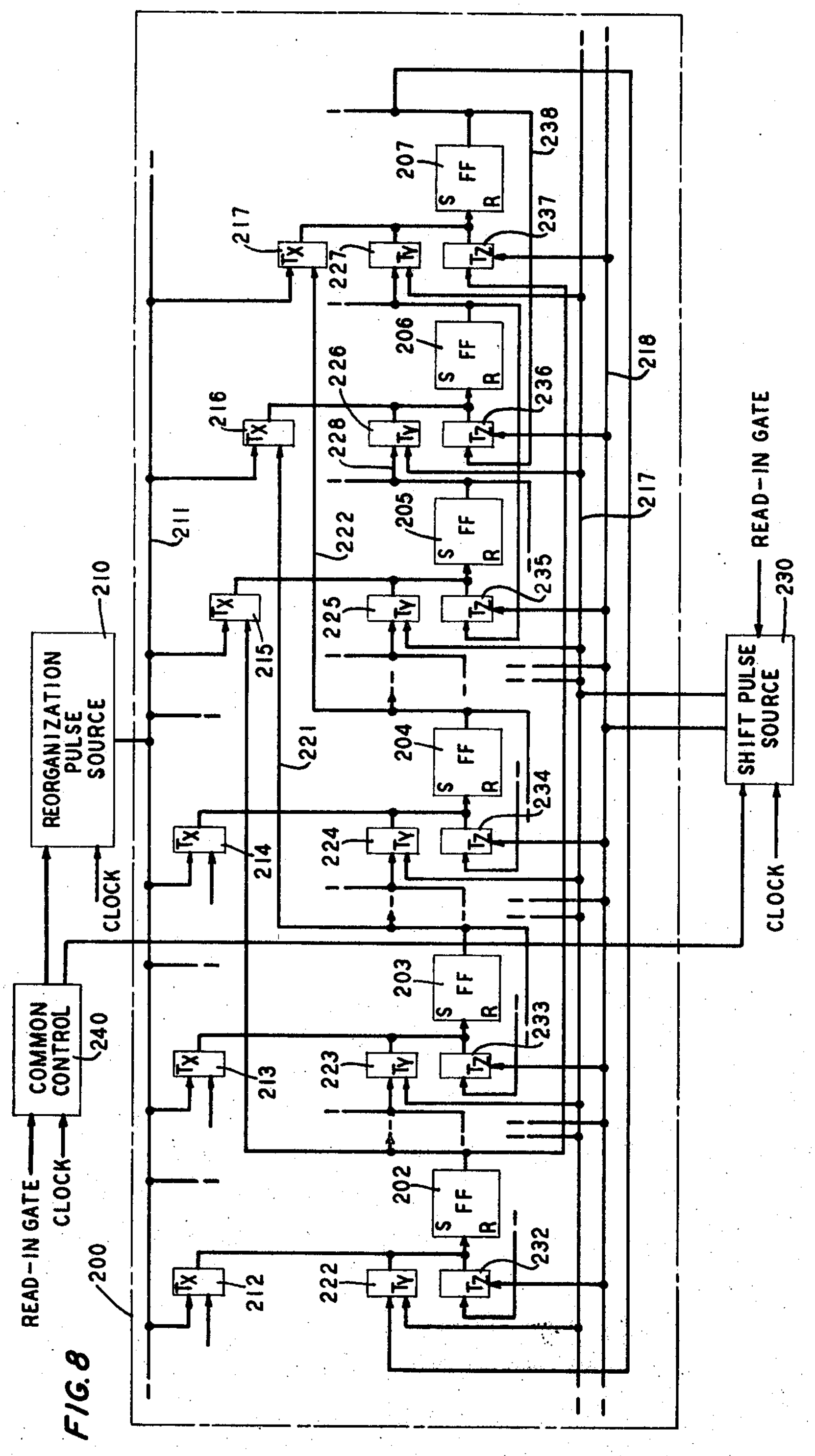
FIG. 8 is a block diagram of an embodiment of the invention having one reorganization path together with one forward and one reverse shift path per stage.

(3) An $n$ stage shift register—One reorganization path and two shift paths per stage Referring now to FIG. 8, there is shown a third embodiment of a high speed shift register 200 that reorganizes information bits into predetermined sequences and shifts data arranged in selected ones of such sequences to speed up long total shift operations. When the data are shifted, they are sometimes shifted one position forward in the register and other times are shifted one position in a reverse direction in the register.

The shift register 200 includes a tandem array of $n$ register stages arranged in a continuous ring. The $n$ stages are shown illustratively as stages, or cells, 202, 203, 204, 205, 206, and 207, each of which stores a different bit of an original data sequence during intervals in a continuous total shift operation. Dashed lines are shown interconnecting the stages 202, 203, 204, and 205 to indicate that additional stages should be interposed where the dashed lines occur. Although in FIG. 8 only six cells of the register 200 are shown to illustrate the invention, greater benefits are derived from use of the invention in registers having many more than six cells.

The individual cells 202, 203, 204, 205, 206, and 207 are bistable memory devices that are constrained to assume either one of two states in response to bilevel input signals representing bits of binary data. One type of such cell is the circuit 30 shown in FIG. 1A and described in connection with the embodiment of FIG. 1. Set terminals S and reset terminals R of each cell are used for storing an initial data sequence in the register 200 to commence each total shift operation.

After a bit of an initial data sequence has been stored in each cell by means of the set lead S and the reset lead R of that cell, all of the bits are transferred from one cell to another cell during transfer intervals, or clock cycles, in response to transfer signals applied to the register. These transfer signals are generated by two pulse sources respectively designated a reorganization pulse source 210 and a shift pulse source 230. The reorganization pulse source 210 and the shift pulse source 230 respond to signals from a common control circuit 240 and from a clock. The shift pulse source 230 is additionally responsive to read-in gate signals.

Reorganization pulses generated by the reorganization pulse source 210 are applied through a bus 211 simultaneously to timing leads $T_X$ of reorganization gates 212, 213, 214, 215, 216, and 217, each associated with an input to a separate register cell. Although only six reorganization gates are shown in FIG. 8, it is to be understood that there is a reorganization gate associated with the input to each cell of the shift register 200. Therefore, dashed lines have been spaced along the bus 211 to indicate further connections between the bus 211 and reorganization gates for register cells not shown.

Each of the reorganization gates 212, 213, 214, 215, 216, and 217, and additional reorganization gates not shown, is a gate circuit that constrains an individual cell to assume one or the other of its two stable states in response to concurrent application of binary input signals and a reorganization pulse. One type of reorganization gate, such as the gate 216 in FIG. 8, is a steering circuit 50, shown in FIG. 8A, which is the same as the circuit 50 described in connection with the FIG. 1B of the embodiment of FIG. 1. Double-rail input leads $X_1$ and $X_0$ of the circuit 50 in FIG. 8A are connected respectively to the "1" output and the "0" output of some cell in the shift register 200. A method to determine the cell to which the leads $X_1$ and $X_0$ are connected is described hereinafter. For the time being, it is noted that a single path 221 in FIG. 8 represents a double-rail connection between the "1" and "0" outputs of the cell 203 and the $X_1$ and $X_0$ leads of the gate 216.

The reorganization pulse source 210 produces positive and zero potential levels separated by positive-going and negative-going transitions of which each negative-going edge is used to initiate a reorganization operation.

In FIG. 8 the cells 202, 203, and 204 are not successive stages, but they are separated from one another by some constant number of cells to illustrate a transfer operation in the register 200 when a reorganization pulse occurs. The constant number of cells from the cell 202 to the cell 203 and from the cell 203 to the cell 204 determines how many positions these cells are displaced from each other. The number of positions that the cell 203 is displaced from the cell 202 and the cell 204 is displaced from the cell 203 is hereinafter referred to as a reorganization constant Q.

The previously mentioned pattern for connecting cell outputs to inputs of reorganization gates can be established by connecting the output of a first cell, such as cell 203, through the path 221 to the input of the reorganization gate 216, which is associated with the input to the cell 206. Thereafter, connect the output of a second cell 204 through a path 222 to the input of the reorganization gate 217, which is associated with the input to the cell 207. The second cell 204 is in a position displaced from the first cell 203 by a number of positions equal to the reorganization constant Q. The cells 206 and 207 are in adjacent positions in the register. This pattern should be followed until the output of each cell is connected by way of a path to the input of one of the reorganization gates. Thus the output of each cell will be connected to the input of a single reorganization gate, and the input of each reorganization gate will be connected to the output of a single cell. It is noted again that $n$ and Q can have no common integral divisor other than one.

A reorganization operation can be accomplished over the reorganization paths if all of the reorganization paths are connected, each reorganization gate is connected to its associated cell, data are stored in all of the cells, and a reorganization pulse is applied over the bus 211 to the timing leads $T_X$. In a manner similar to the reorganization of data in the embodiment of FIG. 1, a first bit stored in the cell 202 just prior to the reorganization pulse is now transferred by way of the gate 215 into the cell 205, a second bit stored in the cell 203 just prior to the reorganization pulse is now transferred by way of the gate 216 into the cell 206, and a third bit stored in the cell 204 just prior to the reorganization pulse is now transferred by way of the gate 217 into the cell 207. In a similar manner each bit stored in the register 200 during an interval $\tau$ just prior to the reorganization pulse is transferred between cells in response to the reorganization pulse to establish a new data sequence for the duration of the next interval $(\tau+1)$. As soon as the data are reorganized into the new sequence, each bit is to be stored in a cell for the duration of the interval $(\tau+1)$. During the interval $(\tau+1)$, adjacent cells store bits that previously during the interval $\tau$ had been stored in cells displaced from each other by a constant number of register positions equal to the reorganization constant Q. Of course, bits stored in the right-hand stages just prior to the reorganization pulse are transferred around the ring to be reinserted from the left.

A second type of transfer signal is generated in sets of shift pulses by the shift pulse source 230 which applies the shift pulses alternatively to a bus 217 or to a bus 218. The shift pulses applied to the bus 217 are coupled simultaneously to timing leads $T_Y$ of shift gates 222, 223, 224, 225, 226, and 227, each associated with an input to a separate register cell. The shift pulses applied to the bus 218 are coupled simultaneously to timing leads $T_Z$ of shift gates 232, 233, 234, 235, 236, and 237 each associated with an input to a separate register cell. Although six shift gates are shown coupled to each of the buses 217 and 218 in FIG. 8, it is to be udnerstood that there is one shift gate coupled between each of the buses 217 and 218 and every individual cell of the register 200. Therefore, the buses 217 and 218 have dashed lines extended from them to indicate further connections between each bus and shift gates for register cells not shown.

Each of the shift gates 222–227, 232–237 and additional shift gates not shown is a gate circuit that constrains an individual cell of the register 200 to assume one or the other of its two stable states in response to concurrent application of binary input signals and a shift pulse. One type of shift gate, such as the gate 226 and the gate 236 in FIG. 8, is a steering circuit, such as the respective steering circuits 50′ and 50″ of FIG. 8A. The steering circuits 50′ and 50″ are duplicates of the steering circuit 50 shown in FIG. 1B. Prime and double prime designations are used to distinguish each of the steering circuits 50, 50′, and 50″ from the others.

The shift gates 222, 223, 224, 225, 226, and 227 are used to simultaneously shift all bits stored in the register 200 one cell to the right, or in the forward direction, while maintaining the data in its sequence. The bus 217 is connected in common to timing leads $T_Y$ of the gates 222–227. A path 228 is a double-rail connection from the "1" and "0" outputs of the cell 205 to the inputs $Y_1$ and $Y_0$ of the gate 226. The bits are shifted one position to the right through similar shift paths between each pair of adjacent cells in response to shift pulses applied over the bus 217.

The shift gates 232, 233, 234, 235, 236, and 237 are used to simultaneously shift all bits stored in the register 200 one cell to the left, or in the reverse direction, while maintaining the data in its sequence. The bus 218 is connected in common to timing leads $T_Z$ of the gates 232–237. A path 238 is a double-rail connection from the "1" and "0" outputs of the cell 207 to the inputs $Z_1$ and $Z_0$ of the gate 236. The bits are shifted one cell to the left through similar shift paths between each pair of adjacent cells in response to shift pulses applied over the bus 218. The cell 205, 206, and 207 are successive, or adjacent, stages of the register 200 and are separated only by the shift gates 226, 227, 235, and 236 to illustrate transfer operations that occur in response to each shift pulse. It should be noted that the output of cell 206 is connected to the input of the shift gate 227 which is associated with the input to the adjacent cell 207 in a forward direction and to the input of the shift gate 235 which is associated with the input to the adjacent cell 205 in a reverse direction. Similarly, the output of every cell is to be connected to the input of the shift gate associated with the input to the adjacent cell in the forward direction and to the input of the shift gate associated with the input to the adjacent cell in the reverse direction.

Two types of shift operation can now be explained if we assume that all the shift paths are connected, a bit is stored in each of the cells, and shift pulses are alternatively applied from the buses 217 and 218. For the following description of the shift operations, we will concentrate on the data stored in the cells 205, 206, and 207.

The first type of shift operation shifts the sequence of bits one position in the forward direction in the shift register 200 in response to a shift pulse from the bus 217. The bit stored in cell 205 just prior to the shift pulse applied from the bus 217 is transferred to cell 206 in response to the pulse. The bit stored in cell 206 just prior to the shift pulse applied from the bus 217 is transferred to cell 207 in response to the pulse. The bit stored in cell 207 just prior to the shift pulse applied from the bus 217 is transferred to an adjacent cell in the forward direction by proceeding around the loop to be reinserted from the left. In a similar manner each bit is shifted to an adjacent cell in the forward direction in response to shift pulses applied over the bus 217.

The second type of shift operation shifts the sequence of bits one position in the reverse direction in the shift register 200 in response to a shift pulse from the bus 218. The bit stored in cell 205 just prior to the shift pulse applied from the bus 218 is transferred to an adjacent cell to the left of cell 205 in response to the pulse. The bit stored in cell 206 just prior to the shift pulse applied from the bus 218 is transferred to cell 205 in response to the pulse. The bit stored in cell 207 just prior to the shift pulse from the bus 218 is transferred to the cell 206 in response to the pulse. A bit stored in the leftmost cell 202 just prior to the shift pulse from the bus 218 is shifted around the ring to be reinserted into the rightmost stage 207. In a similar manner each bit is shifted to an adjacent cell in reverse direction in response to each shift pulse applied over the bus 218.

The maximum time in transfer intervals, or clock cycles, required to complete a total shift operation in the register 200 can be determined to be equal to $$\frac{(Q+1)}{2}(1+[\log_Q n])$$

intervals when Q is an odd number by considering the number of transfer intervals required during the existence of each new sequence of data together with the number of data sequences required for each total shift operation. A Table V has been developed to indicate what transfer operations occur under various circumstances for a register having $n$ stages and a reorganization constant Q equal to an odd number.

TABLE V.—PART A

| Forward Total Shift P | Sequence No. 1 | Sequence No. 2 | .. | Sqeuence No. (1+[logEn]) |
|---|---|---|---|---|
| 0 | $\overbrace{0\ldots0}^{\frac{(Q-1)}{2}}$ | $\overbrace{0\ldots0}^{\frac{(Q-1)}{2}}$ | .. | 0 ...0 |
| 1 | +0 ...0 | 0 ...0 | .. | 0 ...0 |
| 2 | ++0 .0 | 0 ...0 | .. | 0 ...0 |
| : | : | : | :: | : |
| $\frac{(Q-1)}{2}$ | $\overbrace{+\ldots+}^{\frac{(Q-1)}{2}}$ | 0 ...0 | .. | 0 ...0 |
| $\frac{(Q+1)}{2}$ | $\overbrace{-\ldots-}^{\frac{(Q-1)}{2}}$ | $\overbrace{+0\,..0}^{\frac{(Q-1)}{2}}$ | .. | 0 ...0 |
| : | : | : | :: | : |
| (Q−2) | −−0 .0 | +0 ..0 | .. | 0 ...0 |
| (Q−1) | −0 ..0 | +0 ..0 | .. | 0 ...0 |
| Q | 0 ...0 | +0 ..0 | .. | 0 ...0 |
| (Q+1) | +0 ..0 | +0 ..0 | .. | 0 ...0 |
| (Q+2) | ++0 .0 | +0 ..0 | .. | 0 ...0 |
| | | | | |
| : | : | : | :: | : |
| $\frac{(3Q-1)}{2}$ | $\overbrace{+\ldots+}^{\frac{(Q-1)}{2}}$ | $\overbrace{+0\,..0}^{\frac{(Q-1)}{2}}$ | .. | 0 ...0 |
| $\frac{(3Q-1)}{2}$ | $\overbrace{-\ldots-}^{\frac{(Q-1)}{2}}$ | $\overbrace{++0\,.0}^{\frac{(Q-1)}{2}}$ | .. | 0 ...0 |
| : | : | : | :: | : |
| (2Q−2) | −−0 .0 | ++0 .0 | .. | 0 ...0 |
| (2Q−1) | −0 ..0 | ++0 .0 | .. | 0 ...0 |
| 2Q | 0 ...0 | ++0 .0 | .. | 0 ...0 |
| (2Q+1) | +0 ..0 | ++0 .0 | .. | 0 ...0 |
| : | : | : | :: | : |
| $\frac{(Q^2+1)}{2}$ | $\overbrace{-\ldots-}^{\frac{(Q-1)}{2}}$ | $\overbrace{-\ldots-}^{\frac{(Q-1)}{2}}$ | $\overbrace{+0\,..0}^{\frac{(Q-1)}{2}}$ | 0 ...0 |
| : | : | : | :: | : |
| $(1+Q+\ldots+Q^{([\log_Q n])})\left(\frac{Q-1}{2}\right)$ | $\overbrace{+\ldots+}^{\frac{(Q-1)}{2}}$ | $\overbrace{+\ldots+}^{\frac{(Q-1)}{2}}$ | $\overbrace{+\ldots+}^{\frac{(Q-1)}{2}}$ | $\overbrace{+\ldots+}^{\frac{(Q-1)}{2}}$ |
| $\frac{(n-1)}{2}$ | | (if $n$ is odd) | | |
| $\frac{n}{2}$ | | (if $n$ is even) | | |

TABLE V.—PART B

| Reverse Total Shift $n-P$ | Sequence No. 1 | Sequence No. 2 | .. | Sequence No. (1+[log$_Q$]) |
|---|---|---|---|---|
| $n$ | $\overbrace{0\ldots0}^{\frac{(Q-1)}{2}}$ | $\overbrace{0\ldots0}^{\frac{(Q-1)}{2}}$ | .. | $\overbrace{0\ldots0}^{\frac{(Q-1)}{2}}$ |
| $n-1$ | −0 ..0 | 0 ...0 | .. | 0 ...0 |
| $n-2$ | −−0 .0 | 0 ...0 | .. | 0 ...0 |

TABLE V.—PART B—Continued

| Reverse Total Shift $n-P$ | Sequence No. 1 | Sequence No. 2 | .. | Sequence No. (1+[log Q]) |
|---|---|---|---|---|
| ⋮ | ⋮ | ⋮ | ⋮ | ⋮ |
| $n-\frac{(Q-1)}{2}$ | $\overbrace{-\ldots-}^{\frac{(Q-1)}{2}}$ | $\overbrace{0\ldots0}^{\frac{(Q-1)}{2}}$ | .. | 0 ...0 |
| $n-\frac{(Q+1)}{2}$ | $\overbrace{+\ldots+}^{\frac{(Q-1)}{2}}$ | $\overbrace{-0\,..0}^{\frac{(Q-1)}{2}}$ | .. | 0 ...0 |
| ⋮ | ⋮ | ⋮ | ⋮ | ⋮ |
| $n-(Q-2)$ | ++0 .0 | −0 ..0 | .. | 0 ...0 |
| $n-(Q-1)$ | +0 ..0 | −0 ..0 | .. | 0 ...0 |
| $n-Q$ | 0 ...0 | −0 ..0 | .. | 0 ...0 |
| $n-(Q+1)$ | −0 ..0 | −0 ..0 | .. | 0 ...0 |
| $n-(Q+2)$ | −−0 .0 | −0 ..0 | .. | 0 ...0 |
| ⋮ | ⋮ | ⋮ | ⋮ | ⋮ |
| $n-\frac{(3Q-1)}{2}$ | $\overbrace{-\ldots-}^{\frac{(Q-1)}{2}}$ | $\overbrace{-0\,..0}^{\frac{(Q-1)}{2}}$ | .. | 0 ...0 |
| $n-\frac{(3Q+1)}{2}$ | $\overbrace{+\ldots+}^{\frac{(Q-1)}{2}}$ | $\overbrace{--0\,.0}^{\frac{(Q-1)}{2}}$ | .. | 0 ...0 |
| ⋮ | ⋮ | ⋮ | ⋮ | ⋮ |
| $n-(2Q-2)$ | ++0 .0 | −−0 .0 | .. | 0 ...0 |
| $n-(2Q-1)$ | +0 .. 0 | −−0 .0 | .. | 0 ...0 |
| $n-2Q$ | 0 ...0 | −−0 .0 | .. | 0 ...0 |
| $n-(2Q+1)$ | −0 ..0 | −−0 .0 | .. | 0 ...0 |
| ⋮ | ⋮ | ⋮ | ⋮ | ⋮ |
| $n-(1+Q)\frac{(Q-1)}{2}$ | $\overbrace{-\ldots-}^{\frac{(Q-1)}{2}}$ | $\overbrace{-\ldots-}^{\frac{(Q-1)}{2}}$ | 0 ... 0 | 0 ...0 |
| ⋮ | ⋮ | ⋮ | ⋮ | ⋮ |
| $n-(1+Q+\ldots+Q^{(1+[\log_Q n])}\left(\frac{Q-1}{2}\right)$ | $\overbrace{-\ldots-}^{\frac{(Q-1)}{2}}$ | $\overbrace{-\ldots-}^{\frac{(Q-1)}{2}}$ | $\overbrace{-\ldots-}^{\frac{(Q-1)}{2}}$ | $\overbrace{-\ldots-}^{\frac{(Q-1)}{2}}$ |
| $n-\frac{(n-1)}{2}$ | (if $n$ is odd) | | | |
| $n-\frac{(n-2)}{2}$ | (if $n$ is even) | | | |

Part A of the Table V indicates, in a column headed "FORWARD TOTAL SHIFT," a series of consecutive numbers representing total shifts through half of the stages in the forward direction in the register. Part B of the Table V indicates, in a column headed "REVERSE TOTAL SHIFT," a series of numbers representing total shifts through half of the stages in the reverse direction of the register. In both Part A and Part B, there is shown in each row with the relevant desired total shift, a set of shift pulses, shown as +, 0, and − signs, to be applied to the shift gates 222–227 and 232–237 for accomplishing the desired total shift.

Each set of shift pulses for a particular desired total shift is separated into groups in respective columns headed "SEQUENCE NO. 1," "SEQUENCE NO. 2," etc., to indicate the shift pulses applied to the shift gates during the existence of the particular sequence in the register. For simplicity, Table V has been constructed without showing the read-in and successive reorganization operations as shown in Tables I and II but those operations are considered to precede SEQUENCE NO. 1, SEQUENCE NO. 2, etc. in Table V. Therefore, during the existence of SEQUENCE NO. 1, in the forward direction the shift span K equals $+Q^0=+1$; and in the reverse direction the shift span K equals $-Q^0=-1$. During the existence of SEQUENCE NO. 2, in the forward direction, the shift span K equals $+Q^1$; and in the reverse direction the shift span K equals $-Q^1$. The shift span K increases in a power series of Q in both the positive and the negative directions.

In each group of shift pulses of the sets, there is shown a "+" sign to indicate when a shift pulse is applied over the bus 217 to shift the data sequence in the forward direction and a "−" sign to indicate when a shift pulse is applied over the bus 218 to shift the data sequence in the reverse direction. A "0" is used to indicate that no shift pulse is applied during a particular shift interval.

Both Parts A and B of Table V must be used concurrently in the design of a shift register. Part A is used for a shift forward through a first half of the register, and Part B is used for a reverse shift through the second half of the register. The left-hand column of Part B is designated "REVERSE TOTAL SHIFT" to indicate shifts through a particular half of the register, however, the numbers in the column have been chosen to be consecutive numbers in a series 0, 1, 2, . . . $n$. The portion P of each expression is a number equivalent to an actual reverse shift of P positions in the register. The bottom two rows of each part of Table V indicate the greatest total shift in either direction when the total register length $n$ is considered. It is noted that a slight difference is possible in the last possible total shift of Parts A and B depending upon whether $n$ is an odd number or an even number, but the left-hand column of the two parts taken together will be a consecutive series of numbers 0, 1, . . . $(n-1)$, $n$. The expressions including a Q in the left-hand column are shown for key turning points in a pattern of "+" and "−" shift pulses in the remaining columns.

The Table V is constructed by indicating for a shift of zero positions that no shift pulses are to be applied to the shift register no matter what data sequence exists. For a forward shift of one position, one forward shift pulse, a "+," is applied during the existence of SEQUENCE NO. 1, and no other shift pulses are applied. For a forward shift of two positions, two forward shift pulses, "++," are applied during the existence of SEQUENCE NO. 1, and no other shift pusles are applied. One additional shift pulse is applied for each additional position the data are to be shifted up to a desired forward total shift of $$\frac{(Q-1)}{2}$$

positions for which a maximum of $$\frac{(Q-1)}{2}$$

forward shift pulses are applied during the existence of the SEQUENCE NO. 1, and no other shift pulses are applied during the existence of subsequent sequences.

The next longer total shift is through $$\frac{(Q+1)}{2}$$

positions. For a forward shift of $$\frac{(Q+1)}{2}$$

positions, $$\frac{(Q-1)}{2}$$

reversing shift pulses, "— . . —," are applied during the existence of SEQUENCE NO. 1 and one forward shift pulse, "+," is applied during the existence of SEQUENCE NO. 2.

Longer shift operations in consecutive order are accomplished by decreasing the reverse shift pulses by one for each additional position that the data are to be shifted up to a forward total shift of Q positions shown in the left-hand column. Shifts of $(Q+1)$ and $(Q+2)$ positions are accomplished respectively by applying forward shift pulses "+" and "++" during the existence of SEQUENCE NO. 1 and a forward shift pulse "+" during the existence of SEQUENCE NO. 2. Additional shift pulses are applied during the existence of SEQUENCE NO. 1 in increases of one per additional position of desired forward total shift until $$\frac{(Q-1)}{2}$$

forward shift pulses are applied during the existence of SEQUENCE NO. 1 for a total shift of $$\frac{(3Q-1)}{2}$$

positions.

The next longer total shift $$\frac{(3Q+1)}{2}$$

is accomplished by applying $$\frac{(Q-1)}{2}$$

reverse shift pulses during the existence of SEQUENCE NO. 1 and two forward shift pulses, "++," during the existence of SEQUENCE NO. 2.

A pattern is established in the foregoing explanation of Table V. This pattern should be followed to complete the rest of the table.

It should be noted that $$\frac{(Q-1)}{2}$$

intervals are required for application of shift pulses during the existence of each sequence. The maximum number of forward or reverse shift pulses during the existence of each sequence is therefore $$\frac{(Q-1)}{2}$$

The third row from the bottom of both Parts A and B of Table V shows a desired total shift that can occur in a shift register having $n$ stages equal in number to $$(Q^{(1+[\log_Q n])}-1)$$

In an odd length shift register, where $n$ is odd, Part A of Table V is completed through a forward total shift of $$\frac{(n-1)}{2}$$

positions; and Part B of Table V, which is developed in a pattern similar to but in reverse of the pattern of Part A, is completed through a desired reverse total shift of $$n-\frac{(n-1)}{2}$$

positions.

In an even length shift register, where $n$ is even, Parts A and B of Table V are completed respectively through a forward total shift of $n/2$ positions and a reverse total shift of $$n-\frac{(n-2)}{2}$$

positions.

Since Table V is for general application, it should be noticed that when Q is small there may be ambiguous terms arising. For instance, when $Q=3$, the expression $$\frac{(Q-1)}{2}$$

positions of forward total shift is the equivalent of a forward shift of one position. Therefore, the forward shift of one position is the same as the forward shift of $$\frac{(Q-1)}{2}$$

positions, which should be eliminated as an ambiguous term leaving only the series of consecutive numbers 1, 2, 3, . . . .

A forward shift of two positions will not be two forward shift pulses, "++," because we cannot exceed $$\frac{(Q-1)}{2}$$

shift pulses per sequence. Instead, the forward shift of two positions is really a shift of $$\frac{(Q+1)}{2}$$

positions and requires a reverse shift pulse, "—," during the existence of SEQUENCE NO. 1 and a forward shift pulse "+" during the existence of SEQUENCE NO. 2.

During the existence of each data sequence, there are $$\frac{(Q+1)}{2}$$

transfer intervals. In Table V there is shown that $$\frac{(Q-1)}{2}$$

transfer intervals for shift pulses are required for shifting bits arranged in each sequence. Therefore, $$\frac{(Q-1)}{2}$$

shift intervals are used during the existence of each sequence. In addition to the shift intervals, the read-in interval or reorganization transfer interval is required for every sequence. The sum of the reorganization interval and the $$\frac{(Q-1)}{2}$$

shift intervals equals the $$\frac{(Q+1)}{2}$$

transfer intervals required per sequence.

During each total shift operation, $(1+[\log_Q n])$ sequences of data are required to accomplish all possible total shift operations in a register having the reorganization constant Q equal to an odd number. The expression $[\log_Q n]$ numerically equals the largest integer that is smaller than $\log_Q n$.

Since $(1+[\log_Q n])$ sequences of data are required to accomplish a total shift operation and $$\frac{(Q+1)}{2}$$

transfer intervals are required for every sequence, there is a need for only $$\frac{(Q+1)}{2}(1+[\log_Q n])$$

transfer intervals for accomplishing any possible total shift operation in a register having Q equal to an odd number.

Since Parts A and B of the Table V have been developed for general application, they should be cut off on the right-hand side and on the bottom to suit each individual shift register design. The last column on the right-hand side of both Parts A and B is the column which represents the $(1+[\log_Q n])$th sequence of data. The last row of data at the bottom of both Parts A and B is the row for a shift of the positions shown for $n$ equal to an odd or even number as shown.

Considering that reading data into the register 200 is a first reorganization transfer, the intervals of the transfer operations occur in the following order: read-in or first reorganization interval, shift interval (forward, reverse, or no shift), shift interval (forward, reverse, or no shift), $$\ldots\frac{(Q-1)}{2}\text{th}$$

shift interval (forward, reverse, or no shift), reorganization interval, shift interval (forward, reverse, or no shift), shift interval (forward, reverse, or no shift)

$$\ldots\frac{(Q-1)}{2}\text{th}$$

shift interval (forward, reverse, or no shift) . . . until a number of transfer intervals equal to $$\frac{(Q+1)}{2}(1+[\log_Q n])$$

have occurred in a register having Q equal to an odd number.

In a manner similar to the development of Table V, a Table VI has been developed to indicate transfer operations under various circumstances for a register having $n$ stages and a reorganization constant Q equal to an even number. The Table VI is developed and used in the same way that the Table V is developed and used.

TABLE VI.—PART A

| Forward Total Shift P | Sequence No. 1 | Sequence No. 2 | .. | Sequence No. H |
|---|---|---|---|---|
| 0 | $\overbrace{0\ldots0}^{\frac{Q}{2}}$ | $\overbrace{0\ldots0}^{\frac{Q}{2}}$ | .. | 0 ... 0 |
| 1 | +0 .. 0 | 0 ... 0 | .. | 0 ... 0 |
| 2 | ++0 . 0 | 0 ... 0 | .. | 0 ... 0 |
| ⋮ | ⋮ | ⋮ | ⋮ | ⋮ |
| $\frac{Q}{2}$ | $\overbrace{+\ldots+}^{\frac{Q}{2}}$ | $\overbrace{0\ldots0}^{\frac{Q}{2}}$ | .. | 0 ... 0 |
| $\frac{(Q+2)}{2}$ | $\overbrace{-\ldots-0}^{\frac{(Q-2)}{2}}$ | $\overbrace{+0\ldots0}^{\frac{Q}{2}}$ | .. | 0 ... 0 |
| ⋮ | ⋮ | ⋮ | ⋮ | ⋮ |
| (Q−2) | −−0 . 0 | +0 .. 0 | .. | 0 ... 0 |
| (Q−1) | −0 .. 0 | +0 .. 0 | .. | 0 ... 0 |
| Q | 0 ... 0 | +0 .. 0 | .. | 0 ... 0 |
| (Q+1) | +0 .. 0 | +0 .. 0 | .. | 0 ... 0 |
| (Q+2) | ++0 . 0 | +0 .. 0 | .. | 0 ... 0 |
| ⋮ | ⋮ | ⋮ | ⋮ | ⋮ |
| $\frac{3Q}{2}$ | $\overbrace{+\ldots+}^{\frac{Q}{2}}$ | $\overbrace{+0\ldots0}^{\frac{Q}{2}}$ | .. | 0 ... 0 |
| $\frac{(3Q+2)}{2}$ | $\overbrace{-\ldots-0}^{\frac{(Q-2)}{2}}$ | $\overbrace{++0\ldots0}^{\frac{Q}{2}}$ | .. | 0 ... 0 |
| ⋮ | ⋮ | ⋮ | ⋮ | ⋮ |
| (2Q−2) | −−0 . 0 | ++0 . 0 | .. | 0 ... 0 |
| (2Q−1) | −0 .. 0 | ++0 . 0 | .. | 0 ... 0 |
| 2Q | 0 ... 0 | ++0 . 0 | .. | 0 ... 0 |
| (2Q+1) | +0 .. 0 | ++0 . 0 | .. | 0 ... 0 |
| ⋮ | ⋮ | ⋮ | ⋮ | ⋮ |
| $(1+Q)\left(\frac{Q}{2}\right)$ | $\overbrace{+\ldots+}^{\frac{Q}{2}}$ | $\overbrace{+\ldots+}^{\frac{Q}{2}}$ | .. | 0 ... 0 |
| ⋮ | ⋮ | ⋮ | ⋮ | ⋮ |
| $(1+Q+\ldots Q^H)\left(\frac{Q}{2}\right)$ | $\overbrace{+\ldots+}^{\frac{Q}{2}}$ | $\overbrace{+\ldots+}^{\frac{Q}{2}}$ | $\overbrace{+\ldots+}^{\frac{Q}{2}}$ | $\overbrace{+\ldots+}^{\frac{Q}{2}}$ |
| $\frac{(n-1)}{2}$ | (if $n$ is odd) | | | |
| $\frac{n}{2}$ | (if $n$ is even) | | | |

$$H=\left(1+\left[\log_Q\left\{\frac{1-n+nQ}{Q}\right\}\right]\right)$$

TABLE VI.—PART B

| Reverse Total Shift $n-P$ | Sequence No. 1 | Sequence No. 2 | .. | Sequence No. H |
|---|---|---|---|---|
| 0 | $\overbrace{0\ldots0}^{\frac{Q}{2}}$ | $\overbrace{0\ldots0}^{\frac{Q}{2}}$ | .. | 0 . . . 0 |
| $n-1$ | −0 . . 0 | 0 . . . 0 | .. | 0 . . . 0 |
| $n-2$ | . . 0 . 0 | 0 . . . 0 | .. | 0 . . . 0 |
| : | j . | j . | :: | : |
| $n-\frac{Q}{2}$ | $\overbrace{-\ldots-}^{\frac{Q}{2}}$ | $\overbrace{0\ldots0}^{\frac{Q}{2}}$ | .. | 0 . . . 0 |
| $n-\frac{(Q+2)}{2}$ | $\overbrace{+\,..+0}^{\frac{(Q-2)}{2}}$ | $\overbrace{-0\,..0}^{\frac{Q}{2}}$ | .. | 0 . . . 0 |
| : | : | : | :: | : |
| $n-(Q-2)$ | ++0 . 0 | −0 . . 0 | . | 0 . . . 0 |
| $n-(Q-1)$ | +0 . . 0 | −0 . . 0 | .. | 0 . . . 0 |
| $n-Q$ | 0 . . . 0 | −0 . . 0 | .. | 0 . . . 0 |
| $n-(Q+1)$ | −0 . . 0 | −0 . . 0 | .. | 0 . . . 0 |
| $n-(Q+2)$ | −−0 . 0 | −0 . . 0 | .. | 0 . . . 0 |
| : | : | : | :: | : |
| $n-\frac{3Q}{2}$ | $\overbrace{-\ldots-}^{\frac{Q}{2}}$ | $\overbrace{-0\,..0}^{\frac{Q}{2}}$ | .. | 0 . . . 0 |
| $n-\frac{(3Q+2)}{2}$ | $\overbrace{+\,..+0}^{\frac{(Q-2)}{2}}$ | $\overbrace{--0\,.0}^{\frac{Q}{2}}$ | .. | 0 . . . 0 |
| : | : | : | :: | : |
| $n-(2Q-2)$ | ++0 . 0 | −−0 . 0 | .. | 0 . . . 0 |
| $n-(2Q-1)$ | +0 . . 0 | −−0 . 0 | .. | 0 . . . 0 |
| $n-2Q$ | 0 . . . 0 | −−0 . 0 | .. | 0 . . . 0 |
| $n-(2Q+1)$ | −0 . . 0 | −−0 . 0 | .. | 0 . . . 0 |
| : | : | : | :: | : |
| $n-(1+Q)\frac{(Q)}{2}$ | $\overbrace{-\ldots-}^{\frac{Q}{2}}$ | $\overbrace{-\ldots-}^{\frac{Q}{2}}$ | .. | 0 . . . 0 |
| : | : | : | :: | : |
| $n-(1+Q+\ldots Q^{H})\frac{(Q)}{2}$ | $\overbrace{-\ldots-}^{\frac{Q}{2}}$ | $\overbrace{-\ldots-}^{\frac{Q}{2}}$ | $\overbrace{-\ldots-}^{\frac{Q}{2}}$ | $\overbrace{-\ldots-}^{\frac{Q}{2}}$ |
| $n-\frac{(n-1)}{2}$ | (if $n$ is odd) | | | |
| $n-\frac{(n-2)}{2}$ | (if $n$ is even) | | | |

$$H=\left(1+\left[\log_Q\left\{\frac{1-n+nQ}{Q}\right\}\right]\right)$$

The third row from the bottom of both Parts A and B of Table VI shows desired total shifts that can occur in a shift register having $n$ stages equal in number to $$\left(\frac{Q^{(H+1)}-1}{Q}\right)$$

The maximum time in transfer intervals, or clock cycles, required to complete a total shift operation in the register 200 can be determined to be equal to $$\left(1+\frac{Q}{2}\right)\left(1+\left[\log_Q\left\{\frac{1-n+nQ}{Q}\right\}\right]\right)$$

intervals when Q is an even number by considering the number of transfer intervals required during the existence of each new sequence of data together with the number of data sequences required for each total shift operation.

During the existence of each data sequence, there are $$\left(\frac{Q}{2}+1\right)$$

transfer intervals. In Table VI there is shown that (Q/2) transfer intervals for shift pulses are required for shifting bits arranged in each sequence. Therefore (Q/2) shift intervals are used during the existence of each sequence. In addition to the shift intervals, there is the read-in interval or reorganization transfer interval required for every sequence. The sum of the reorganization interval and the (Q/2) shift intervals equals the $$\left(\frac{Q}{2}+1\right)$$

transfer intervals required per sequence.

During each total shift operation $$\left(1+\left[\log_Q\left\{\frac{1-n+nQ}{Q}\right\}\right]\right)$$

sequences of data are required to accomplish all possible total shift operations in a register having Q equal to an even number. The expression $$\left[\log_Q\left\{\frac{1-n+nQ}{Q}\right\}\right]$$

numerically equals the largest integer that is smaller than the number $$\log_Q\left\{\frac{1-n+nQ}{Q}\right\}$$

Since $$\left(1+\left[\log_Q\left\{\frac{1-n+nQ}{Q}\right\}\right]\right)$$

sequences of data are required to accomplish a total shift operation and $$\left(\frac{Q}{2}+1\right)$$

transfer intervals are required for every sequence, there is a need for only $$\left(\frac{Q}{2}+1\right)\left(1+\left[\log_Q\left\{\frac{1-n+nQ}{Q}\right\}\right]\right)$$

transfer intervals for accomplishing any possible total shift operation in a register having Q equal to an even number.

The common control circuit 240 of FIG. 8 is to be arranged in a similar manner to the common control circuit 104 of the embodiment of FIGS. 2 and 3. The details of the common control circuit 240 are not shown, because it is designed along the concept of circuit 104 discussed in connection with FIG. 2. Therefore, the common control circuit 240 accomplishes the counting of transfer operations for each data sequence and the counting of the number of data sequences that occur during each total shift operation. As the common control circuit 240 progresses in its counting during each total shift operation, it applies essential information to the reorganization pulse source 210 and to the shift pulse source 230 for assuring that pulses are generated by the sources 210 and 230 in accordance with the applicable Table V or VI.

Figure 9A:
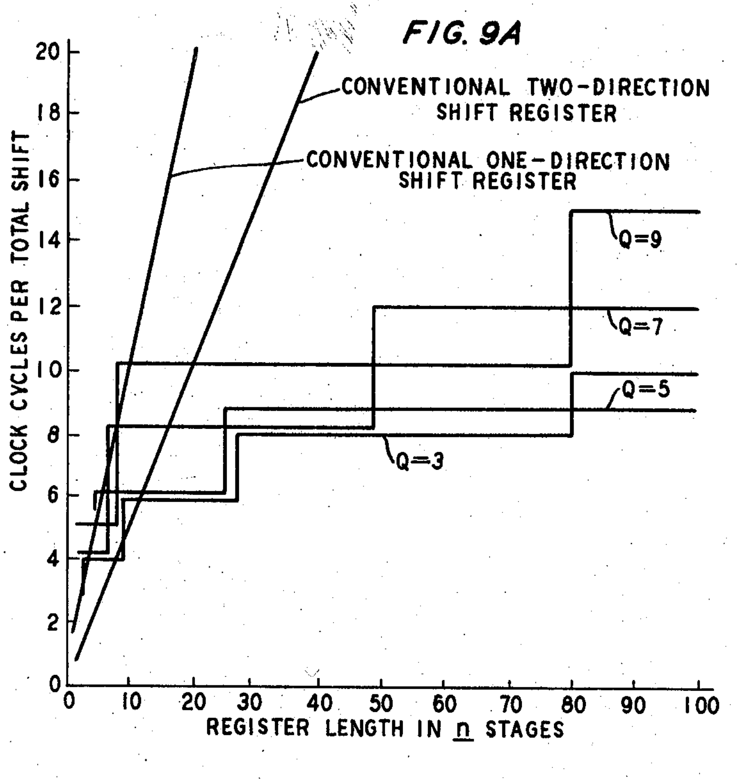
FIGS. 9A and 9B are graphs showing the relative performance of shift registers arranged in accordance with the embodiment of FIG. 8 and conventional shift registers.
Figure 9B:
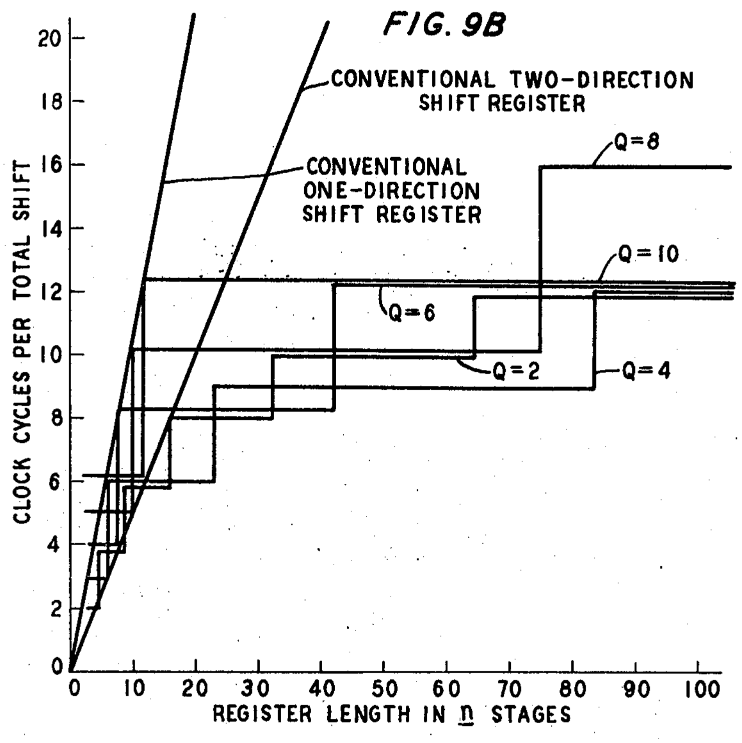

It has been found that a favorable ratio of clock cycles, or transfer intervals required to complete a total shift operation, to total register stages $n$ exists for shift registers arranged in accordance with the shift register 200. As the shift register length increases in the number of stages $n$, such ratio becomes more and more favorable. An indication of the relative performance of shift registers arranged to have selected reorganization constants as indicated and conventional one-direction and two-direcion shift registers is shown in the graphs of FIGS. 9A and 9B for ready comparison of this invention with the prior art. The graph of FIG. 9A is associated with registers having Q equal an odd number, and the graph of FIG. 9B is associated with registers having Q equal an even number. The graphs clearly show that fewer clock cycles are required to perform long desired total shifts in registers arranged to reorganize data, in accordance with the reorganization constants shown, than are required for either type of conventional shift register where the lines designated with various values of Q are below the lines representing conventional shift registers.

The graph is most useful when a circuit designer knows how many stages *n* he wants in a register. He enters the graph from the horizontal base line at the required number of stages and proceeds vertically until the lowest line is reached. Then if the *n* and the Q of the intersected line have no common integral divisor other than one, a register can be constructed with that Q as a basis for reorganization.

Figure 10:
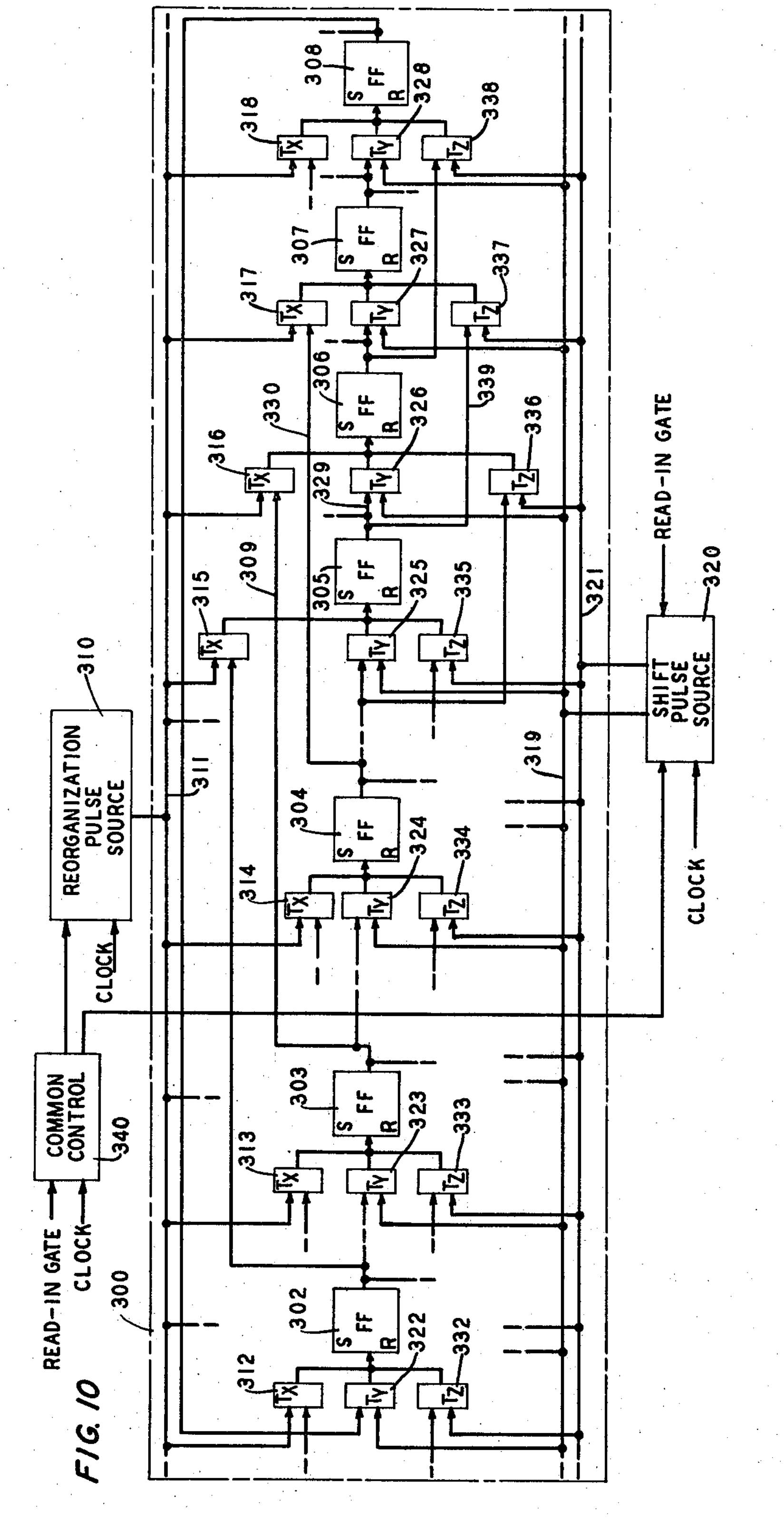
FIG. 10 is a block diagram of an embodiment of the invention having one reorganization path together with two different forward shift paths per stage.

(4) Another *n* stage shift register—One reorganization path and two shift paths per stage Referring now to FIG. 10, there is shown a further embodiment of a high speed shift register 300 that reorganizes information bits into predetermined sequences and shifts data arranged in selected ones of such sequences to speed up long shift operations. When the data are shifted, they are sometimes shifted one position forward in the register and other times are shifted two positions forward in the register.

The shift register 300 includes a tandem array of *n* register stages arranged in a continuous ring. The *n* stages are shown illustratively as stages, or cells, 302, 303, 304, 305, 306, 307, and 308, each of which stores a different bit of an original data sequence during intervals in a continuous total shift operation. Dashed lines are shown interconnecting the stages 302, 303, 304, and 305 to indicate that additional stages should be interposed where the dashed lines occur. Although in FIG. 10 only seven cells of the register 300 are shown to illustrate the invention, greater benefits are derived from use of the invention in registers having many more than seven cells.

The individual cells 302, 303, 304, 305, 306, 307, and 308 are bistable memory devices that are constrained to assume either one of two states in response to bilevel input signals representing bits of binary data. One type of such cell is the circuit 30 shown in FIG. 1A and described in connection with the embodiment of FIG. 1.

After a bit of an initial data sequence has been stored in each cell through means of the set lead S and reset lead R, each of the bits is transferred from one cell to another cell during transfer intervals, or clock cycles, in response to transfer signals applied to the register. These transfer signals are generated by two pulse sources respectively designated a reorganization pulse source 310 and a shift pulse source 320. The reorganization pulse source 310 and the shift pulse source 320 respond to signals from a common control circuit 340 and from a clock. The shift pulse source 320 is additionally responsive to read-in gate signals.

Reorganization pulses generated by the reorganization pulse source 310 are applied through a bus 311 simultaneously to timing leads $T_X$ of reorganization gates 312, 313, 314, 315, 316, 317, and 318, each associated with an input to a separate register cell. Although only seven reorganization gates are shown in FIG. 10, it is to be understood that there is a reorganization gate associated with the input to each cell of the shift register 300. Therefore, dashed lines have been spaced along the bus 311 to further indicate connections between the bus 311 and reorganization gates for register cells not shown.

Each of the reorganization gates 312, 313, 314, 315, 316, 317, and 318, and additional reorganization gates not shown, is a gate circuit that constrains an individual cell to assume one or the other of its two stable states in response to concurrent application of binary input signals and a reorganization pulse. One type of reorganization gate, such as the gate 316 in FIG. 10, is a steering circuit 50 shown in FIG. 8A (the same circuit as the circuit 50 described in connection with the FIG. 1B of the embodiment of FIG. 1). Double-rail input leads $X_1$ and $X_0$ of the circuit 50 are connected respectively to the "1" output and the "0" output of some cell in the shift register 300. A method to determine the cell to which the leads $X_1$ and $X_0$ are connected is described hereinafter. For the time being, it is noted that a single path 309 represents a double-rail connection from the "1" and "0" outputs of cell 303 to the leads $X_1$ and $X_0$ of the gate 316.

The reorganization pulse source 310 produces positive and zero potential levels separated by positive-going and negative-going transitions of which each negative-going edge is used to initiate a reorganization operation.

In FIG. 10 the cells 302, 303, and 304 are not successive stages, but they are separated from one another by some constant number of cells to illustrate a transfer operation in the register 300 when a reorganization pulse occurs. The constant number of cells from the cell 302 to the cell 303 and from the cell 303 to the cell 304 determines how many positions these cells are displaced from each other. The number of positions that the cell 303 is displaced from the cell 302 and the cell 304 is displaced from the cell 303 is hereinafter referred to as a reorganization constant Q.

A previously mentioned pattern for connecting cell outputs to inputs of reorganization gates can be established by connecting the output of a first cell, such as the cell 303, through the path 309 to the input of the reorganization gate 316, which is associated with the input to the cell 306. Thereafter, connect the output of a second cell 304 through a path 330 to the input of the reorganization gate 317 which is associated with the input to the cell 307. The cell 304 is in a position displaced from the first cell 303 by a number of register positions equal to the reorganization constant Q. The cells 306 and 307 are in adjacent positions in the register. This pattern should be followed until the output of each cell is connected by way of a path to the input of one of the reorganization gates. It is again noted that *n* and Q can have no common integral divisor other than one. Thus the output of each cell will be connected to the input of a single reorganization gate, and the input of each reorganization gate will be connected to the output of a single cell.

A reorganization operation can be accomplished over the reorganization paths if all of the reorganization paths are connected, each reorganization gate is connected to its associated cell, a bit is stored in each of the cells, and a reorganization pulse is applied over the bus 311 to the timing leads $T_X$. In a manner similar to the reorganization of data in the embodiment of FIG. 1, a first bit stored in the cell 302 just prior to the reorganization pulse is now transferred by way of the gate 315 into the cell 305, a second bit stored in the cell 303 just prior to the reorganization pulse is now transferred by way of the gate 316 into the cell 306, and a third bit stored in the cell 304 just prior to the reorganization pulse is now transferred by way of the gate 317 into the cell 307. In a similar manner each bit, stored in the register 300 during an interval $\tau$ just prior to the reorganization pulse, is transferred between cells in response to the reorganization pulse to establish a new data sequence for the duration of the next interval $(\tau+1)$. As soon as the data are reorganized into the new sequence, each bit is stored in a cell for the duration of the interval $(\tau+1)$. During the interval $(\tau+1)$, adjacent cells store bits that previously during the interval $\tau$ had been stored in cells displaced from each other by a constant number of register positions equal to the reorganization constant Q. Of course, bits stored in the right-hand stages just prior to the reorganization pulse are transferred around the ring to be reinserted from the left in accordance with the pattern for reorganization.

A second type of transfer signal is generated in sets of shift pulses by the shift pulse source 320. Shift pulses produced by the shift pulse source 320 are applied alternatively to a bus 319 or a bus 321. The shift pulses applied to the bus 319 are coupled simultaneously to timing leads $T_Y$ of shift gates 322, 323, 324, 325, 326, 327, and 328 each associated with an input to a separate register cell. The shift pulses applied to the bus 321 are coupled simultaneously to timing leads $T_Z$ of shift gates 332, 333, 334, 335, 336, 337, and 338, each associated with an input to a separate register cell. Although seven shift gates are shown coupled between each of the buses 319 and 321 and the cells in FIG. 10, it is to be understood that there is one shift gate coupled between each of the buses 319 and 321 and every individual cell of the shift register 300. Therefore, the buses 319 and 321 have dashed lines extended from them to indicate a connection between each bus and a shift gate for each of the *n* cells of the shift register 300.

Each of the shift gates 322 through 328, and 332 through 338, and additional shift gates not shown is a gate circuit that constrains an individual cell of the register 300 to assume one or the other of its two stable states in response to concurrent application of binary input signals and a shift pulse. In a shift register in which the reorganization gates are circuits such as circuit 50 in FIG. 8A, the shift gates associated with each reorganization gate and the input to one cell, such as the gates 326 and 336 in FIG. 10, should also be steering circuits such as circuits 50′ and 50″. As previously mentioned the circuits 50′ and 50″ are duplicates of the steering circuit 50 shown in FIG. 1B. The prime and double prime designations are used to distinguish each of the steering circuits 50, 50′, and 50″ from the others.

The shift gates 322, 323, 324, 325, 326, 327 and 328 are all considered to be similar to the circuit 50′ and are used to simultaneously shift all bits stored in the register 300 one cell in the forward direction, that is to the right, while maintaining the data in its sequence. The bus 319 is connected in common to the timing leads $T_Y$ of the gates 322–328. A path 329 is a double-rail connection from the "1" and "0" outputs of the cell 305 to the inputs $Y_1$ and $Y_0$ of the gate 326. The bits are shifted one position forward through similar shift paths between each pair of adjacent cells in response to shift pulses applied over the bus 319.

The shift gates 332, 333, 334, 335, 336, 337, and 338 are all considered to be similar to the circuit 50″ and are used to simultaneously shift all bits stored in the register 300 two cells in the forward direction while maintaining the data sequence. The bus 321 is connected in common to the timing leads $T_Z$ of the gates 332–338. A path 339 is a double-rail connection from the "1" and "0" outputs of the cell 305 to the inputs $Z_1$ and $Z_0$ of the gate 337. The bits are shifted two positions forward through similar shift paths between cells in response to pulses applied over the bus 321.

The cells 305, 306, 307, and 308 are successive, or adjacent, stages separated by the shift gates 326, 327, and 328 to illustrate transfer operations that occur in response to each type of shift pulse. It should be noted that the output of cell 305 is connected to the input of the shift gate 326 which is associated with the input to the adjacent cell 306. The output of cell 305 is also connected to the input of the shift gate 337 associated with the input to the cell 307 located two positions to the right of cell 305. Similarly, the output of every cell is to be connected to the input of the shift gate associated with the adjacent cell to the right and to the input of the shift gate associated with the cell located two positions to the right.

Two types of shift operation can now be explained if we assume that all the shift paths are connected, a bit is stored in each of the cells, and shift pulses are alternatively applied from the buses 319 and 321. For the following description of the shift operations we will concentrate on the data bits initially stored in the cells 305, 306, and 307.

The first type of shift operation shifts the sequence of bits one position in the forward direction in the shift register 300 in response to a shift pulse from the bus 319. The bit stored in cell 305 just prior to the shift pulse applied from the bus 319 is transferred to cell 306 in response to the pulse. The bit stored in cell 306 just prior to the shift pulse applied from the bus 319 is transferred to cell 307 in response to the pulse. The bit stored in the cell 307 just prior to the shift pulse applied from the bus 319 is transferred to cell 308 in response to the pulse. In a similar manner each bit is shifted one cell in the forward direction in response to shift pulses applied over the bus 319. Of course, a bit stored in the rightmost stage 308 just prior to a shift pulse from the bus 319 is shifted around the ring to be reinserted from the left.

The second type of shift operation shifts the sequence of bits two positions forward in the shift register in response to a shift pulse from the bus 321. The bit stored in cell 305 just prior to the shift pulse applied from the bus 321 is transferred by way of the gate 337 to the cell 307 in response to the pulse. The bit stored in cell 306 just prior to the shift pulse applied from the bus 321 is transferred by way of the gate 338 to the cell 308 in response to the pulse. Bits stored in stages 307 and 308 just prior to a shift pulse from the bus 321 are shifted around the ring to be reinserted from the left in response to the pulse. In a similar manner each bit is shifted two positions forward in response to each pulse applied over the bus 321.

The maximum time in transfer intervals, or clock cycles, required to complete a total shift operation in the register 300 can be determined to equal $$\frac{(Q+1)}{2}(1+[\log_Q n])$$

when Q is an odd number by considering the number of transfers required during the existence of each new sequence of data together with the number of data sequences required for each total shift operation. The Table V (Parts A and B) discussed in connection with the embodiment of FIG. 8 also indicates the transfer operations that occur under various circumstances in a shift register such as the register 300 having *n* stages and a reorganization constant Q equal to an odd number. When the Table V is used in connection with the register 300, some modification of that table is required.

It is noted that a completed Table V for any particular shift register will show a consecutive series of numbers 0, 1, 2, 3, . . . down the column captioned "FORWARD TOTAL SHIFT" in Part A. The series continues from the bottom of Part A to the bottom of Part B and up the column captioned "REVERSE TOTAL SHIFT" in the Part B. Consider that those separate columns are combined into one long column in which each of the numbers designates the number of positions P that data are to be shifted in the forward direction during a total shift operation.

Such a combined table can be modified for use in a shift register such as the shift register 300 by adding one column for indicating each total shift in the register 300. In the additional column, each number N designates the number of positions that data are to be shifted in the forward direction during a total shift operation. In establishing the additional column, each number N is equal to a particular number P but is placed in the additional column in a row where the number $$P=\frac{(Q[\log_Q n]-1)}{2}$$

occurs under the caption "FORWARD TOTAL SHIFT."

Each number N is accordingly placed in the additional column in consecutive order. Care must be taken to consider the modulus $n$ of the closed number system of the column captioned "FORWARD TOTAL SHIFT" when positioning the numbers N in the additional column.

Aside from the additional column indicating the number of positions of each total shift operation, the Table V remains intact. Therefore the register 300 like the register 200 uses $$\frac{(Q+1)}{2}(1+[\log_Q n])$$

intervals for completing every total shift operation to assure sufficient time for completing the longest possible shift whenever it occurs in a register having Q equal to an odd number.

The maximum time in transfer intervals, or clock cycles, required to complete a total shift operation in the register 300 can be determined to be equal to $$\left(1+\frac{Q}{2}\right)\left(1+\left[\log_Q\left\{\frac{1-n+nQ}{Q}\right\}\right]\right)$$

when Q is an even number by considering the number of transfer intervals required during the existence of each new data sequence together with the number of data sequences required for each total shift operation. The Table VI (Parts A and B) discussed in connection with the embodiment of FIG. 8 also indicates the transfer operations that occur under various circumstances in a shift register such as the register 300 having $n$ stages and a reorganization constant Q equal to an even number. When the Table VI is used in connection with the register 300, some modification of that table is required.

It is noted that a complete Table VI for any particular shift register will show a consecutive series of numbers down the column captioned "FORWARD TOTAL SHIFT" in Part A. The series continues from the bottom of Part A to the bottom of Part B and up the column captioned "REVERSE TOTAL SHIFT" in Part B. Thus a combined Table VI can be constructed to be similar to the combined Table V previously described.

The combined Table VI can be modified for use in the shift register 300 by adding one column to indicate each total shift in the register 300. In the additional column, each number N designates the number of positions that data are to be shifted in the forward direction during a total shift operation. In establishing the additional column, each number N is equal to a particular number P but is placed in the additional column in a row where the number $$P-\frac{Q}{(Q-1)}\cdot\frac{(Q^H-1)}{2}$$

occurs under the caption "FORWARD TOTAL SHIFT." Each number N is accordingly placed in the additional column in consecutive order. Care must be taken to consider the modulus $n$ of the closed number system of the column captioned "FORWARD TOTAL SHIFT" when positioning the numbers N in the additional column.

Aside from the additional column indicating the number of positions of each total shift operation, the Table VI remains intact. Therefore the register 300 like the register 200 uses $$\left(1+\frac{Q}{2}\right)\left(1+\left[\log_Q\left\{\frac{1-n+nQ}{Q}\right\}\right]\right)$$

intervals for completing every total shift operation to assure sufficient time for completing the longest possible shift whenever it occurs in a register having Q equal to an even number.

Again considering that reading data into the register 300 is a first reorganization transfer, the intervals of the transfer operations occur in the following order: first reorganization interval, shift interval (1 position, 2 positions, or no shift) or intervals, reorganization interval, shift interval (1 position, 2 positions, or no shift) or intervals until a total number of transfer intervals equal to the number represented by the expression $$\left(1+\frac{Q}{2}\right)\left(1+\left[\log_Q\left\{\frac{1-n+nQ}{2}\right\}\right]\right)$$

have occurred in a register having Q equal to an even number.

As a result of each reorganization operation in the order of transfers just mentioned, a new shift span is established in the register so that a shift pulse applied over the bus 319 causes the data to be shifted one cell to the right, but this is effectively the same as shifting through an existing shift span K in one shift interval. Alternatively a shift pulse applied over the bus 321 causes the data to be shifted two cells to the right, but this is effectively the same as shifting through twice an existing shift span K in one shift interval.

When bits are stored in the initial sequence, a shift span $K=Q^0=1$ exists betwen bits stored adjacently. If a pulse is applied over the bus 319 while the shift span $K=Q^0$ exists, each bit is effectively shifted $Q^0=1$, or one, position in the register. If a pulse is applied over the bus 321 while the shift span $K=Q^0=1$ exists, each bit is effectively shifted $2\cdot Q^0=2\cdot 1$, or two, positions in the register.

After a next subsequent reorganization pulse, a shift span $K=Q^1=Q$ exists between bits stored adjacently. If a shift pulse is applied over the bus 319 while the shift span $K=Q^1$ exists, each bit is effectively shifted $Q^1=Q$, or Q, positions in the register. If a pulse is applied over the bus 321 while the shift span $K=Q^1$ exists, each bit is effectively shifted $2\cdot Q^1=2\cdot Q$, or 2Q, positions in the register.

A further reorganization pulse produces a shift span $K=Q^2=Q\cdot Q$ between bits stored adjacently. If a shift pulse is applied over bus 319 while shift span $K=Q^2$ exists, each bit is effectively shifted $Q^2=Q\cdot Q$ positions in the register. If a shift pulse is applied over bus 321 while the shift span $K=Q^2$ exists, each bit is effectively shifted $2\cdot Q^2=2\cdot Q\cdot Q$ positions in the register.

The shift span K increases in a power series of Q as a result of each subsequent reorganization transfer until $$\frac{(Q+1)}{2}(1+[\log_Q n])$$

intervals have elapsed for a register having Q equal to an odd number and until $$\left(1+\frac{Q}{2}\right)\left(1+\left[\log_Q\left\{\frac{1-n+nQ}{Q}\right\}\right]\right)$$

intervals have elapsed for a register having Q equal to an even number, thereby indicating that sufficient time has elapsed to complete the longest possible shift in the register. Then the data in the register can be read out, the register can be cleared, and another new sequence of data can be read into the register to start another total shift operation.

The common control circuit 340 of FIG. 10 is to be arranged in a similar manner to the common control circuit 104 of the embodiment of FIGS. 2 and 3. Therefore the common control circuit 340 accomplishes the counting of transfer operations for each data sequence and the counting of the number of data sequences that occur during each total shift operation. As the common control circuit 340 progresses in its counting during each total shift operation, it applies essentially information to the reorganization pulse source 310 and the shift pulse source 320 for assuring that pulses are generated by the sources 310 and 320 in accordance with the Tables V and VI as modified for the register 300.

It has been found that a favorable ratio of clock cycles, or transfer intervals required to complete a total shift operation, to total register stages $n$ exists for shift registers arranged in accordance with the shift register 300.

As the shift register length $n$ increases in the number of stages, such ratio becomes more and more favorable in a manner previously described in connection with the shift register 200 of FIG. 8 and shown graphically in FIGS. 9A and 9B.

Figure 11:
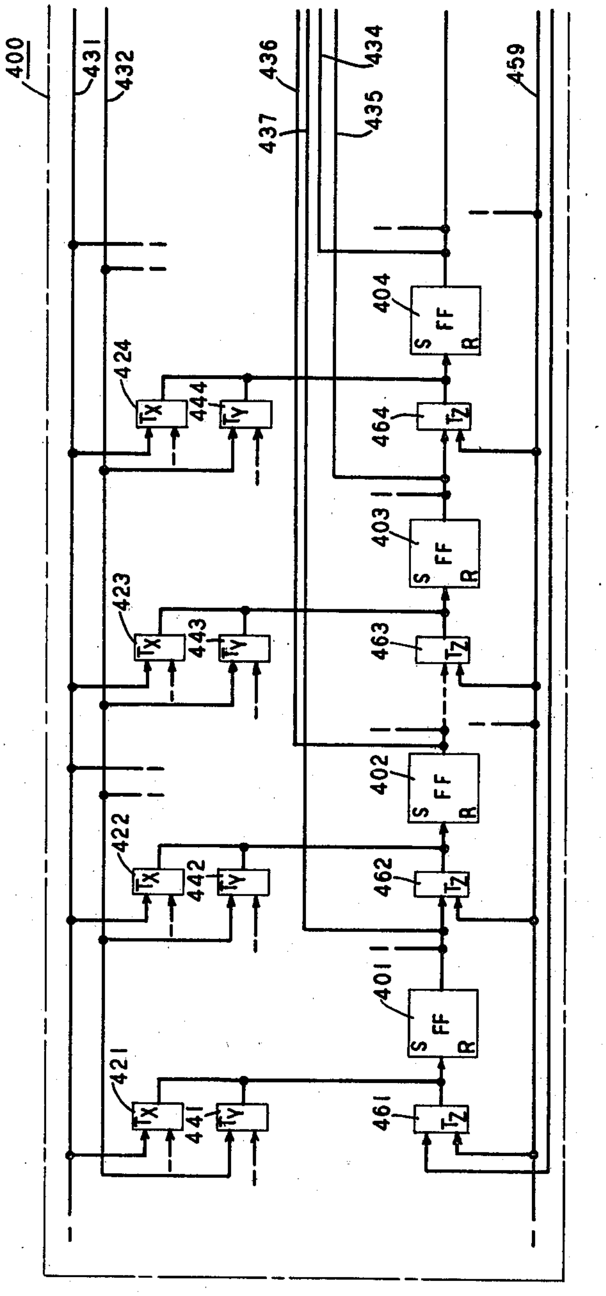
FIGS. 11 and 12 when positioned as shown in FIG. 13 are a block diagram of another embodiment of the invention having two reorganization paths per stage.
Figure 13:
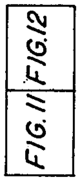
Figure 12:
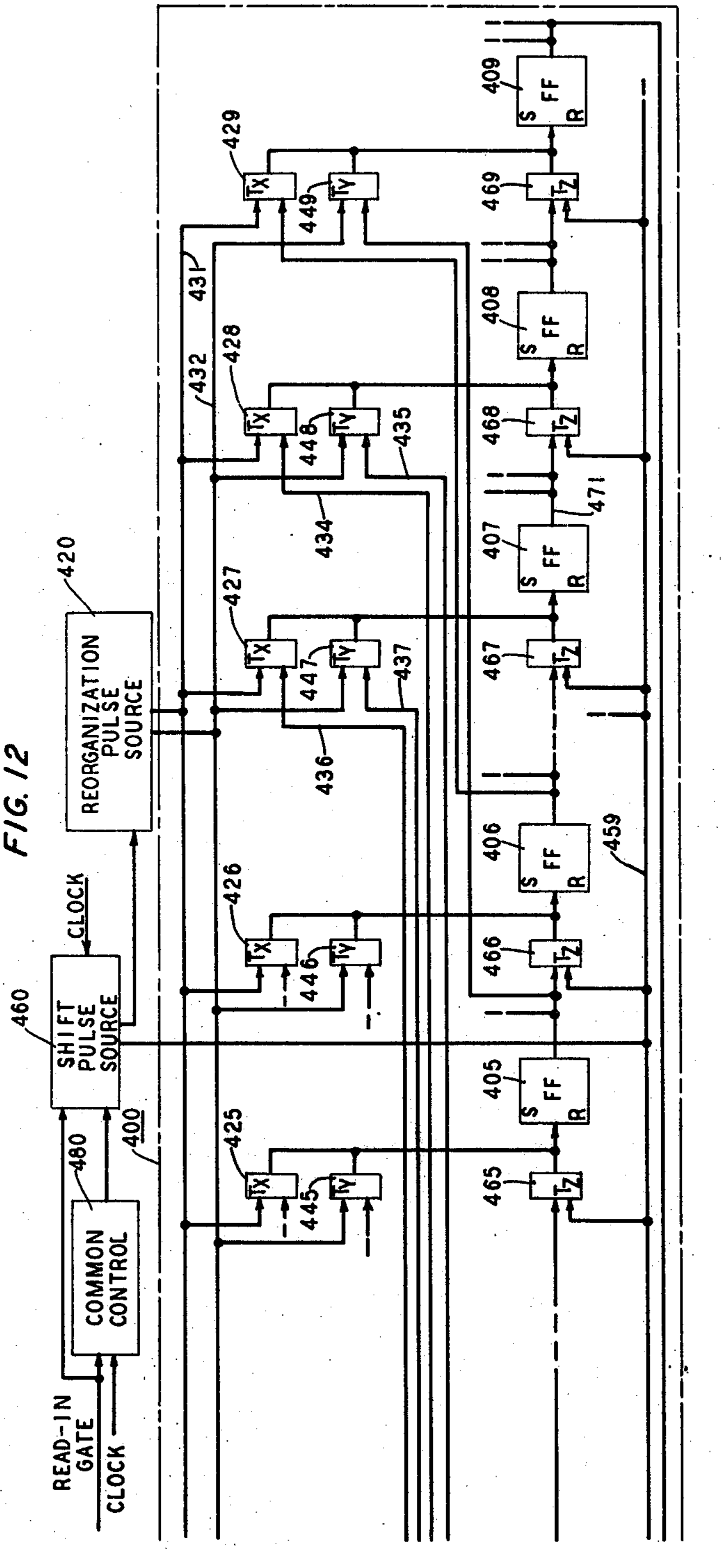

(5) An $n$ stage shift register—Two reorganization paths and one shift path per stage Referring now to FIGS. 11 and 12, which are to be positioned as shown in FIG. 13, there is shown an embodiment of a high speed shift register 400 that reorganizes information bits into predetermined sequences and shifts data arranged in selected ones of such sequences to speed up long total shift operations. When the data are reorganized, they are sometimes reorganized over a group of primary reorganization paths which merely reorganize the data into a new sequence in a manner used in the embodiment of FIG. 1. At other times, the data are reorganized over a group of secondary organization paths which affect a shift transfer and a reorganization transfer in a single reorganization operation requiring just one transfer interval, or clock cycle.

The shift register 400 includes a tandem array of $n$ register stages arranged in a continuous ring. The $n$ stages are shown illustratively as stages, or cells, 401, 402, 403, 404, 405, 406, 407, 408, and 409, each of which stores a different bit of an original data sequence during intervals of a total shift operation. Dashed lines are shown interconnecting the stages 402–403, 404–405, and 406–407 to indicate that additional stages are to be interposed where the dashed lines occur. Although in FIGS. 11 and 12 only nine cells of the register 400 are shown to illustrate the invention, greater benefits are derived from use of the invention in registers having many more than nine cells.

The individual cells 401–409 are bistable memory devices that are constrained to assume either one of two stable states in response to bilevel input signals representing bits of binary data. One type of such cell is a bistable flip-flop circuit such as the circuit 30 shown in FIG. 1A. A set terminal S and a reset terminal R of each cell are used for storing an initial data sequence in the register 400 to commence each total shift operation.

After a bit of an initial data sequence has been stored in each cell of the register 400 by means of the set lead S and the reset lead R of the individual cells, the data bits are transferred from one cell to another cell during transfer intervals, or clock cycles, in response to transfer signals applied to the register. These transfer signals are generated by two pulse sources respectively designated a reorganization pulse source 420 and a shift pulse source 460. The reorganization pulse source 420 is responsive only to signals from the shift pulse source 460. The shift pulse source 460 responds to signals from a common control circuit 480, to signals from a clock, and to read-in gate signals.

Primary and secondary reorganization pulses are generated by the reorganization pulse source 420 which applies those pulses respectively to a bus 431 or a bus 432. The primary reorganization pulses, designated X and applied to the bus 431, are coupled simultaneously to timing leads $T_X$ of primary reorganization gates 421, 422, 423, 424, 425, 426, 427, 428, and 429, each associated with an input to a separate register cell. The secondary reorganization pulses, designated Y and applied to the bus 432, are coupled simultaneously to timing leads $T_Y$ of secondary reorganization gates 441, 442, 443, 444, 445, 446, 447, 448, and 449, each associated with an input to a separate register cell. Although nine reorganization gates are shown coupled to each of the buses 431 and 432, it is to be understood that there is one reorganization gate coupled between each of the buses 431 and 432 and every individual cell of the register 400. Therefore, the buses 431 and 432 have dashed lines extended from them to indicate a connection between each bus and a reorganization gate of each of the $n$ cells of the register 400.

Each of the primary reorganization gates 421 through 429, each of the secondary reorganization gates 431 through 439, and each additional reorganization gate not shown is a gate circuit that constrains an individual cell of the register 400 to assume one or the other of its two stable states in response to concurrent application of binary input signals and a reorganization pulse. The steering input circuits 50 and 50′ in FIG. 8A and described in connection with the embodiment of FIG. 8 is one arrangement of gates that may be used for the primary and secondary reorganization gates associated with the input to one cell, such as the gates 428 and 448 in FIG. 12.

The primary reorganization gates 421 through 429 are all considered to be similar to the circuit 50 and are used to reorganize the data stored in the register 400 into a new sequence in response to each primary reorganization pulse X applied to the timing leads $T_X$. Double-rail input signals on leads $X_1$ and $X_0$ of the circuit 50 are coupled respectively from the "1" output and the "0" output of some cell in the shift register 400. A method to determine the cell from which the leads $X_1$ and $X_0$ are coupled is identical with the method described in connection with the embodiment of FIG. 8. It is noted that a single path 434 in FIGS. 11 and 12 represents a double-rail connection from the "1" and "0" outputs of the cell 404 to the $X_1$ and $X_0$ leads of the primary reorganization gate 428.

The secondary reorganization gates 441–449 are all considered to be similar to the circuit 50′ and are used to effectively shift an existing sequence of data one register position and to reorganize the existing sequence into a new sequence of data in response to each secondary reorganization pulse Y applied to the timing leads $T_Y$. Double-rail input signals on leads $Y_1$ and $Y_0$ of each circuit 50′ are coupled respectively from the "1" output and the "0" output of some cell in the register 400. A method to determine the proper cell is described hereinafter. It is noted, however, that a single path 435 in FIGS. 11 and 12 represents a double-rail connection from the "1" and "0" outputs of the cell 403 to the $Y_1$ and $Y_0$ leads of the secondary reorganization gate 448.

The primary and secondary reorganization pulses X and Y produced by the reorganization pulse source 420 are similar to the form of the reorganization pulses produced in the embodiment of FIG. 8. The timing of the pulses X and Y, however, is different from the timing used in the embodiment of FIG. 8 and is further described hereinafter in a discussion of FIG. 15.

In FIGS. 11 and 12 the cells 402 and 403, 404 and 405, and 406 and 407 generally are not successive stages, and are hereinafter considered to be separated from one another by some constant number of cells to illustrate a transfer operation in the register 400 when a primary or a secondary reorganization pulse occurs. The cells 401 and 402, 403 and 404, and 405 and 406 are considered to be positioned adjacently and are pairs having the output of both cells gated through reorganization paths to the input of one cell. The constant number of cells from the cell 402 to the cell 404 and from the cell 404 to the cell 406 determines how many positions these cells are displaced from each other. The constant number of positions that the cell 404 is displaced from the cell 402, or that the cell 406 is displaced from the cell 404, is hereinafter referred to as a reorganization constant Q. It is again noted that $n$ and Q can have no common integral division other than one.

The previously mentioned pattern for connecting cell outputs to inputs of primary reorganization gates can be established by connecting the output of a first cell, such as the cell 402, through a path 436 to the input of the gates 427, which is associated with the input to the cell 407. This pattern may be started by such coupling between any two cells, but it is often convenient to start by coupling the output of one selected cell to its own primary reorganization gate input. Thereafter, connect the output of a second cell 404 through the path 434 to the input of the gate 428, which is associated with the input to the cell 408. The second cell 404 is in a position displaced from the first cell 402 by a number of positions equal to the reorganization constant Q. The cells 407 and 408 are in adjacent positions in the register. The pattern should be followed until the output of each cell is connected by way of a path to the input of one of the primary reorganization gates. Thus the output of each cell will be connected to the input of a single primary reorganization gate, and the input of each primary reorganization gate will be coupled from the output of a single cell.

A reorganization operation can be accomplished over the primary reorganization paths if all of those paths are connected, each primary reorganization gate is connected to its associated cell, a bit is stored in each of the cells, and a reorganization pulse is applied through the bus 431 to the timing leads $T_X$.

In a manner similar to the reorganization of data in the embodiment of FIG. 1, bits stored respectively in cells 402, 404, and 406 just prior to the primary reorganization pulse X on lead 431 are now transferred by way of gates 427, 428, and 429 into the cells 407, 408, and 409. In a similar manner, each bit stored in the register 400 during an interval $\tau$ just prior to the primary reorganization pulse X is transferred between cells in response to the pulse to establish a new data sequence for the duration of the next interval $(\tau+1)$. During the interval $(\tau+1)$, adjacent cells store bits that previously during the interval $\tau$ had been stored in cells displaced from each other by a constant number of register positions equal to the reorganization constant Q. Data from the right-hand stages just prior to the primary reorganization pulse are transferred around the ring to be reinserted from the left in accordance with the pattern for primary reorganization.

The previously mentioned pattern for connecting cell outputs to inputs of secondary reorganization gates can be established by connecting the output of a third cell 401 through a path 437 to the input of the gate 447, which is associated with the input to the cell 407. Thereafter, connect the output of a fourth cell 403 through the path 435 to the input of the gate 448, which is associated with the input to the cell 408. The third and fourth cells 401 and 403 are respectively one position in the reverse direction of the register from the first and second cells 402 and 404. This pattern of paths to the inputs of the secondary reorganization gates should be followed until the output of each cell is connected by way of a path to the input of one secondary reorganization gate. Thus the output of each cell will be connected to the input of a single secondary reorganization gate, and the input of each secondary reorganization gate will be coupled from the output of a single cell.

A reorganization operation including an effective shift transfer and a reorganization transfer of the data sequence can be accomplished over the secondary reorganization paths if all of those paths are connected, each secondary reorganization gate is connected to its associated cell, a bit is stored in each of the cells, and a reorganization pulse is applied through the bus 432 to the timing leads $T_Y$.

Bits stored respectively in cells 401, 403, and 405 just prior to the secondary reorganization pulse Y on lead 432 are now transferred by way of the gates 447, 448, and 449 into cells 407, 408, and 409. In a similar manner in one clock cycle, each bit stored in the register 400 during an interval $\tau$ just prior to the secondary reorganization pulse Y is transferred between cells in response to the pulse to effectively shift the existing sequence one register position and to establish a new data sequence for the duration of the next interval $(\tau+1)$. During the interval $(\tau+1)$, each cell stores a bit that previously during the interval $\tau$ had been stored in a cell adjacent to and in the reverse direction from the cell where a bit would come from in response to a primary reorganization pulse. Data from the right-hand stages just prior to the secondary reorganization pulse are transferred around the ring to be reinserted from the left in accordance with the pattern for secondary reorganization.

The result of the secondary reorganization is to position each bit of data in the register 400 in a stage where it would be positioned after a shift pulse and a reorganization pulse in the embodiment of FIG. 1. Therefore, rather than requiring two clock cycles, or transfer intervals, the effect of the shift transfer and the reorganization transfer are accomplished simultaneously in one transfer interval by means of the group of paths through the secondary reorganization gates.

A method for determining whether to reorganize data through the primary or through the secondary reorganization gates is described hereinafter.

Sets of shift pulses are generated by the shift pulse source 460 which applies the shift pulses through a bus 459, in FIGS. 11 and 12, simultaneously to shift gates 461, 462, 463, 464, 465, 466, 468, and 469, each associated with an input to a separate register cell. Although nine shift gates are shown in FIGS. 11 and 12, it is to be understood that there is one and only one shift gate associated with an input to each cell of the shift register 400. Therefore dashed lines are extended from the bus 459 to indicate further connections between the bus 459 and shift gates for cells not shown.

Each of the shift gates may be a steering circuit 50" as shown in FIG. 8A and described in connection with the embodiment of FIG. 8. When the circuit 50" is connected in a register as shown in FIGS. 11 and 12, the double-rail input signals on leads $Z_1$ and $Z_0$ of the circuit 50" are coupled respectively from the "1" output and the "0" output of an adjacent cell in the reverse direction of the register. It is noted that double-rail connections are represented by a single line, such as the path 471, from the "1" and "0" outputs of the cell 407 to the leads $Z_1$ and $Z_0$ of the gate 468.

In FIGS. 11 and 12 the shift operation is accomplished in a manner similar to the shift operation described in the embodiment of FIG. 1. Each data bit moves from the stage where it had been stored into an adjacent stage to the right. Thus the bit stored in cell 407 just prior to a shift pulse is transferred by way of the shift gate 468 to the cell 408, and the bit stored in the cell 408 just prior to the shift pulse is transferred by way of the shift gate 469 to the cell 409. In a similar manner, each bit is shifted one cell to the right, or in the forward direction, in response to the shift pulse applied over the bus 459. Of course, the bit stored in the rightmost stage just prior to the shift pulse is shifted around the ring to the leftmost stage.

The maximum time in transfer intervals, or clock cycles, required to complete a total shift operation in the shift register 400 can be determined to be equal to $(Q-1)(1+[\log_Q n])+1$ intervals, or clock cycles by considering the number of transfer intervals required for shifting each new sequence of data together with the number of data sequences required for each total shift operation. The intervals required to complete a total shift operation are expressed similarly to the expression used in describing the embodiment of FIG. 1; however, the multiplier $(Q-1)$ for the embodiment of FIGS. 11 and 12 is smaller than the multiplier Q for the embodiment of FIG. 1.

In the embodiment of FIGS. 11 and 12, the total shift operation requires only $(Q-1)$ transfer intervals during the existence of each data sequence because $(Q-1)$ transfer intervals are required for shifting bits arranged in each sequence. All shift and reorganization operations except the initial read-in operation are completed on each sequence within $(Q-1)$ intervals because the reorganization transfer, as used in the embodiment of FIG. 1 to produce each new sequence, is merged in time with the last shift transfer for the preceding sequence in the embodiment of FIGS. 11 and 12. The read-in operation, taken as the first reorganization, is uncombined, thus producing the +1 at the end of the expression. During a total shift operation, the register 400 requires $$(1+[\log_Q n])$$

sequences of data to accomplish all possible total shift operations. The expression $[\log_Q n]$ again is numerically equal to the largest integer that is smaller than $\log_Q n$.

Since $(1+[\log_Q n])$ sequences of data are required to accomplish a total shift operation, $(Q-1)$ transfer intervals are required for every sequence, and (1) transfer is required for read-in, there is a need for $(Q-1)$ $$(1+[\log_Q n])+1$$

tansfer intervals, or clock cycles, during every total shift operation.

Now recalling that each reorganization operation establishes a new sequence in the register, we shall consider that the entry of data into the register 400, that is the read-in operation, is a transfer operation storing the initial sequence of data in the register. With this consideration in mind, the intervals for the transfer operations occur in the following order: initial sequence interval, $(Q-2)$ shift intervals, primary or secondary reorganization interval, $(Q-2)$ shift intervals, primary or secondary reorganization interval, until a number of intervals, or clock cycles, equal to $(Q-1)(1+[\log_Q n])+1$ have occurred.

As a result of entering the initial sequence and of performing each reorganization operation (either primary or secondary) in the transfers just mentioned, a shift span K equal to some power of the reorganization constant Q is established in the register. Each shift pulse when applied over the bus 459 to the terminals $T_Z$ during the designated intervals causes each bit of the data to be shifted in one shift interval, or clock cycle, through as many positions of the initial sequence as the existing shift span K in a manner similar to the shift operation in the embodiment of FIG. 1. The secondary reorganization pulse Y when applied during the designated intervals also causes each bit to be shifted in one interval through as many positions of the initial sequence as the shift span K existing when the secondary reorganization pulse occurs. Additionally, a new sequence of data is established.

The primary reorganization pulse X when applied over the bus 431 to the terminals $T_X$ causes a reorganization of the data sequence through the primary reorganizatioi gates into a new sequence also in a manner similar to the embodiment of FIG. 1. Thus a bit stored in a cell position $M_i(\tau)$ is transferred into a cell position $$M_j^i(\tau+1)(\text{mod } n)$$

and there is produced the following set of integers designating the sequence of cells during the interval $(\tau+1)$:

$$M_j^i(\tau+1)(\text{mod } n);\ M_{j+1}^{i+Q}(\tau+1)(\text{mod } n);$$
$$M_{j+2}^{i+2Q}(\tau+1)(\text{mod } n);\ \ldots\ M_{j+n-1}^{i+(n-1)Q}(\tau+1)(\text{mod } n)$$

The (mod $n$) applies to both the $i$ and $j$ terms of the set.

The secondary reorgaanization pulse Y applied over the bus 432 to the terminals $T_Y$ causes a reorganization of the data sequence through the secondary reorganization gates into a new sequence in a manner somewhat different from the embodiment of FIG. 1. A bit stored in a cell position $M_{i-1}(\tau)$, relative to a bit which would be transferred into a cell position $M_j^i(\tau+1)(\text{mod } n)$ through the primary reorganization path, is transferred $$M_{i-1}(\tau)\rightarrow M_j^{i-1}(\tau+1)(\text{mod } n)$$

in response to the pulse applied by way of the bus 432. Thus rather than performing a shift transfer and reorganization transfer in two separate transfer intervals, each bit is transferred in one transfer interval directly, as a result of a secondary reorganization transfer, to a position where it would be located in the embodiment of FIG. 1 as a result of both a shift transfer and a reorganization transfer.

The control circuits of the embodiment of FIGS. 11 and 12 are similar to the control circuits used in connection with the embodiment of FIG. 1 and described more particularly in connection with the seven-stage register of the embodiment of FIGS. 2 and 3. The control circuit for the general embodiment of FIGS. 11 and 12 includes a common control circuit, a reorganization pulse source, and a shift pulse source.

Figure 14:
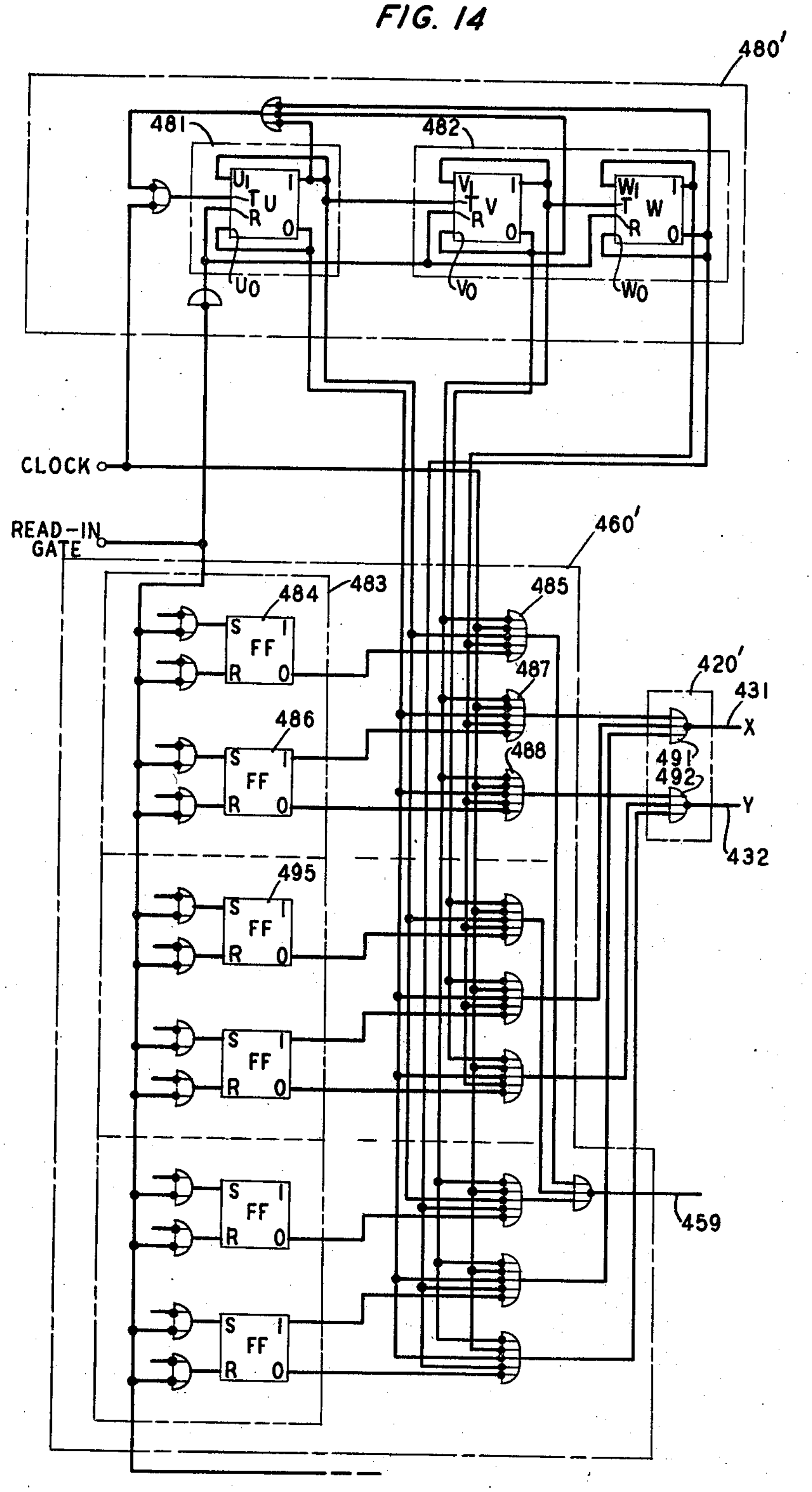
FIG. 14 is a schematic diagram of control circuits that are used in conjunction with an arrangement similar to the embodiment of FIGS. 11 and 12.

In FIG. 14 there is shown an illustrative control circuit for a ten-stage shift register constructed with the reorganization constant $Q=3$ in accordance with the principles of the embodiment of FIGS. 11 and 12. In FIG. 14 the common control circuit 480′ is arranged to be similar to the common control circuit 104 of FIG. 2 except that a transfer operation counter 481 counts $(Q-1)$ transfers rather than Q transfers as in the counter 111 of FIG. 2. A sequence counter 482 in FIG. 14 counts $(1+[\log_Q n])$ sequences per total shift operation just like the counter 112 of FIG. 2. The count state of the counters 481 and 482 are applied to a shift pulse source 460′ which is arranged to generate shift pulses together with signals for controlling a reorganization pulse source 420′. The counters 481 and 482 do not directly control the reorganization pulse source 420′ in FIG. 14 as the reorganization pulse source 105 is controlled in FIG. 2, but they indirectly control the source 420′ through the shift pulse source 460′ because of the merger of the shift operation and the reorganization operation over secondary reorganization paths.

In FIG. 14, a shift count register 483, which is similar to the register 106 of FIG. 2, includes a plurality of stages for storing bits representing the desired total shift at the commencement of each total shift operation. In the shift count register 483, there are $(Q-1)$ stages for each sequence of data occurring during any total shift operation. The first $(Q-2)$ stages for each sequence of data, such as stage 484, each store a bit used to control one separate shift set gate, such as the shift set gate 485. Since $Q=3$, the first $(Q-2)$ stages are equal to one stage, and only one stage 484 and one shift set gate are required for each sequence. If Q were greater than three, additional shift set gates would be required for each sequence.

The last of the $(Q-1)$ stages, such as a stage 486, for each data sequence is used to determine whether a primary or a secondary reorganization pulse occurs during each reorganization interval. The stage 486 has complementary outputs used to separately control two reorganization pulse set gates. The principal output "1" of the stage 486 controls a primary reorganization pulse set gate 487, and the complement output "0" controls a secondary reorganization pulse set gate 488. The gates 487 and 488 are arranged to be similar to the gate 485, which is similar to the shift set gate 142 of FIG. 2. The only difference in the arrangement of these gates 485, 487, and 488 is the selection of the inputs taken from the counters 481 and 482. The inputs for the gate 485 are chosen to produce shift pulses in accordance with the shift set gate 142 of FIG. 2. The inputs for the gates 487 and 488 are chosen to alternatively produce a reorganization pulse during the first reorganization pulse interval.

In operation, data representing the desired total shift in code form is stored in the stages of the shift count register 483 in response to a read-in gate signal. In the code, a "1" or a "0" is stored in each stage of each group storing information for a particular sequence. Each group of stages stores "1's" and "0's" for one Q-ary digit. The number of "1's" stored in the group is equal to the particular desired Q-ary digit for its sequence. Concurrently, with the read-in gate signal, the common control circuit 480' commences counting clock cycles. As a result, the first shift set gate 485 produces a shift pulse during the second clock cycle if a "1" is stored in the first register stage 484. Additional shift pulses for the first sequence could be produced; but because $Q=3$, there are only $(Q-1)=2$ transfers required for each sequence.

If a "0" is stored in the $(Q-1)$th stage 486, the last of the $(Q-1)$ transfers is a primary reorganization operation, which is controlled by a reorganization pulse initiated by the reorganization pulse source 420' in response to the primary reorganization set gate 487 of the shift pulse source 460'. A primary reorganization pulse gate 491 of the reorganization pulse source 420' would then produce the dotted primary reorganization pulse X as shown in FIG. 15.

If a "1" is stored in the stage 486, the last of the $(Q-1)$ transfers is a shift operation merged with a reorganization operation or secondary reorganization. This secondary reorganization is controlled by a secondary reorganization pulse Y initiated by the reorganization pulse source 420' in response to the secondary reorganization set gate 488 of the shift pulse source 460'. A secondary reorganization pulse gate 492 of the source 420' produces the secondary reorganization pulse Y as shown in FIG. 15.

Figure 15:
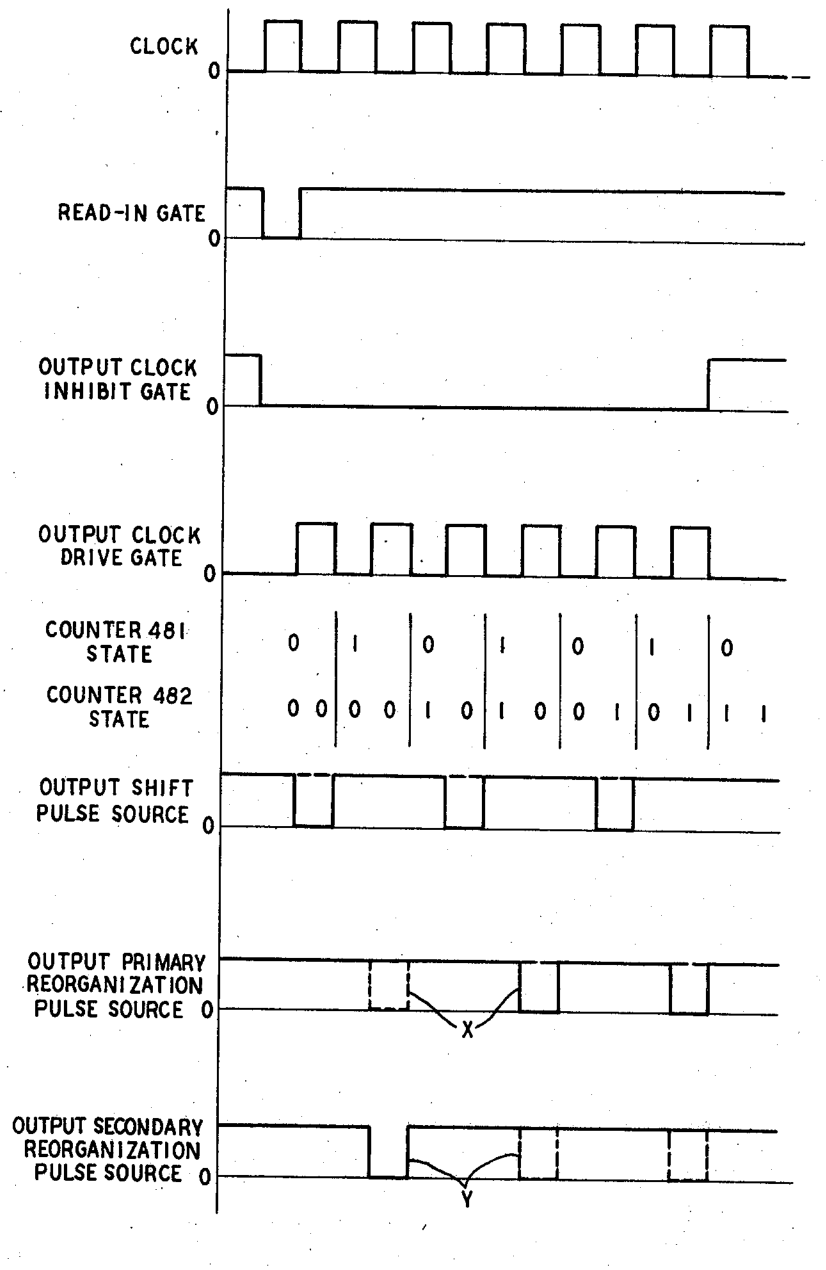
FIG. 15 is a timing diagram for the circuits of FIG. 14.

In FIG. 15, the pulses X and Y are shown with one a solid line and the other a dotted line during each appropriate interval to indicate these pulses are alternative during each reorganization interval. Reorganization pulses are produced by the primary reorganization gate 491 when an X appears in a Table VII, and by the secondary reorganization gate 492 when a Y appears in that table.

Subsequent to either the primary or secondary reorganization operation that occurs, the data are further shifted or not in accordance with another bit stored in the first stage 495 of a second group of stages in the shift count register 483. Thus the total shift operation proceeds step by step until $(Q-1)(1+[\log_Q n])+1$ transfer operations have occurred.

applied over the bus 432 to the terminals $T_Y$ for activating the secondary reorganization gates.

Although the control circuits of the FIG. 14 are arranged specifically for the ten cell shift register, the Table VII is a general table that can be extended in width and in depth to include greater total shifts than are possible in the ten cell register. The width and depth of Table VII depend upon the number of cells $n$ in a particular register for which the Table VII is prepared. The Table VII must be wide enough to include a total shift of $(n-1)$ positions and must be deep enough to include an interval during which the shift span $K=Q^{[\log_Q n]}$.

As soon as the last shift interval has expired in a total shift operation according to Table VII, the data in the shift register 400 are ready to be sorted through output leads from the cells as described for the embodiment of FIG. 1.

In an arrangement similar to the arrangement of Table VII, additional tables can be compiled for shift registers similar to the register 400 but having the reorganization constant Q equal to any integer greater than one as long as $n$ and Q have no common integral divisor. These additional tables can be readily developed by writing at the top of each column the desired total shift in decimal and Q-ary numbers. The row for a read-in interval $\tau_1$ will indicate a "1" in each column under the caption "DESIRED TOTAL SHIFT." The "INITIAL SEQUENCE" must be shown for $(Q-2)$ intervals, or rows, designated $\tau_2, \tau_3 \ldots \tau_{Q-1}$. A reorganization interval, or row, designated $\tau_Q$ will indicate an "X" or a "Y," respectively, depending respectively upon whether the Q-ary integer in the rightmost position at the column head is less than its maximum value or equal to its maximum value. The SEQUENCE NO. 2 is to be shown for $(Q-2)$ intervals, designated $\tau_{Q+1} \ldots \tau_{2Q-2}$. Then another primary or secondary reorganization transfer occurs during an interval $\tau_{2Q-1}$. These intervals are entered from top to bottom in the table until $(Q-1)(1+[\log_Q n])+1$ are shown.

It has been found that a favorable ratio of clock cycles to total register stages $n$ exists for shift registers arranged

TABLE VII

[$Q=3$]

| | Interval | Shift Span K | Desired Total Shift 000 / 0 | 001 / 1 | 002 / 2 | 010 / 3 | 011 / 4 | 012 / 5 | 020 / 6 | 021 / 7 | 022 / 8 | 100 / 9 |
|---|---|---|---|---|---|---|---|---|---|---|---|---|
| Read In | $\tau_1$ | | 1 | 1 | 1 | 1 | 1 | 1 | 1 | 1 | 1 | 1 |
| Initial Sequence | $\tau_2$ | $Q^0=1$ | 0 | 1 | 1 | 0 | 1 | 1 | 0 | 1 | 1 | 0 |
| Reorganization | $\tau_3$ | $Q^0=1$ | X | X | Y | X | X | Y | X | X | Y | X |
| Sequence No. 2 | $\tau_4$ | $Q^1=3$ | 0 | 0 | 0 | 1 | 1 | 1 | 1 | 1 | 1 | 0 |
| Reorganization | $\tau_5$ | $Q^1=3$ | X | X | X | X | X | X | Y | Y | Y | X |
| Sequence No. 3 | $\tau_6$ | $Q^2=9$ | 0 | 0 | 0 | 0 | 0 | 0 | 0 | 0 | 0 | 1 |

Table VII is included to show pulse sets for a series of desired total shifts for a shift register, similar to the register 400 of FIGS. 11 and 12 but specifically arranged to have a reorganization constant $Q=3$. The reorganization constant $Q=3$ is obtained by connecting the primary and secondary reorganization gates and the cells as previously described.

Figure 16:
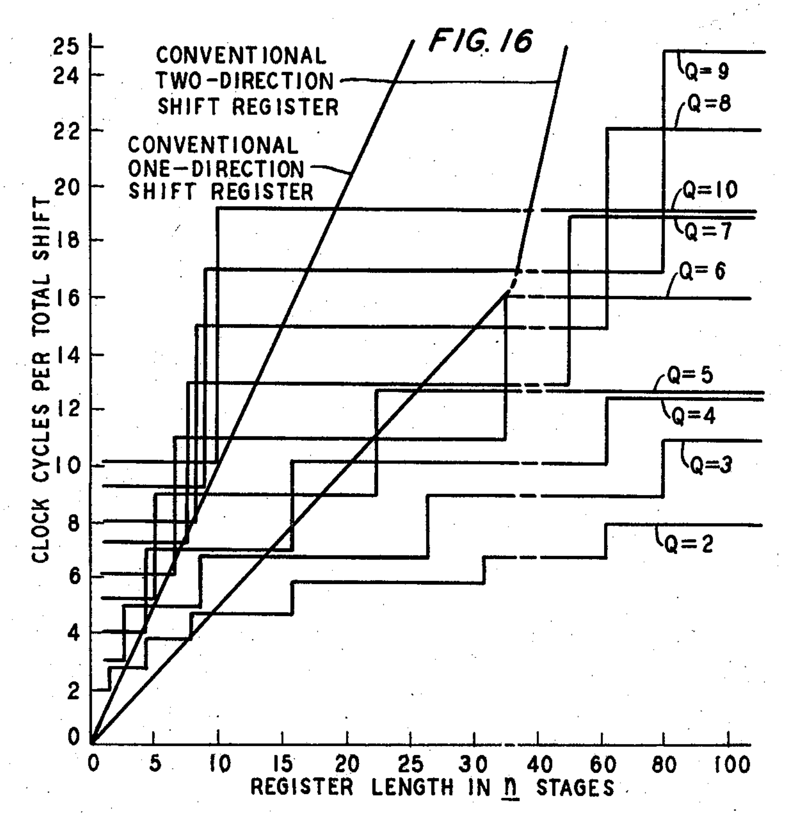
FIG. 16 is a graph showing relative performance of shift registers arranged in accordance with the embodiment of FIGS. 11 and 12 and conventional shift registers.

The Table VII is similar to the Table II in all respects except that the last interval for shifting during the existence of each sequence, such as the INITIAL SEQUENCE and the SEQUENCE NO. 2, is merged with the reorganization interval following those respective intervals for shifting. In the Table VII there is shown a reorganization pulse X or Y occurring during each interval for reorganizating the data sequence. The reorganization pulse X occurs in the Table VII wherever a "0" occurs in the relevant last interval for each sequence of Table II and is the pulse X applied over the bus 431 to the terminals $T_X$ for activating the primary reorganization gates. The reorganization pulse Y occurs in the Table VII wherever a "1" occurs in the relevant last interval for each sequence of Table II. The pulse Y is in accordance with the shift register 400. As the shift register length increases in the number of stages $n$, such ratio becomes more and more favorable. An indication of the relative performance of shift registers arranged to have selected reorganization constants Q as indicated and conventional one-direction and two-direction shift registers is shown in the graph of FIG. 16. The graph clearly shows that fewer clock cycles are required to perform long desired total shifts in registers arranged to reorganize data, in accordance with the reorganization constants Q shown, than are required for either type of conventional shift register where the lines designated with the various values of Q are below the lines representing conventional shift registers.

The graph of FIG. 16 is most useful when a circuit designer knows how many stages $n$ he wants in a register. He enters the graph from the horizontal base line at the required number of stages $n$ and proceeds vertically until he intersects with the lowest line representing the performance of a register. Then compare $n$ with the Q of the intersected line to assure the $n$ and the Q have no common integral divisor other than one. If there is no other common integral divisor, a register having the reorganization constant Q of the intersected line can be constructed.

It is noted that the expression $(Q-1)$, representing the number of transfer operations that are to occur during the existence of each sequence of a total shift operation, reduces to $Q-1=1$ when a register is arranged to have a reorganization constant $Q=2$. Since the last shift operation for each sequence is merged with the reorganization operation, there is no need for separate shift pulses. The pulse sets reduce to a series of reorganization pulses arranged in sets for alternative reorganization over primary and secondary shift paths. In such a register, the bus 459 and all of the gates used to feed the bus 459 are unnecessary and can be eliminated from the register 400.

The above detailed description is illustrative of five embodiments of the invention, and it is to be understood that additional embodiments thereof will be obvious to those skilled in the art. These additional embodiments are considered to be within the scope of the invention.

What is claimed is:

1. A register including a plurality of $n$ stages arranged in a tandem sequential ring, each stage having a different designation $i$ during a first interval $\tau$ and a different designation $j$ during a second interval $(\tau+1)$, and each stage storing a different bit of a data sequence during the first interval $\tau$, wherein $i$ and $j$ are integers, characterized in that reorganization means intercouples stages for transferring each bit which was stored in a stage having the designation $i$ during the first interval $\tau$ into a stage having the designation $j$ during the second interval $(\tau+1)$, and the reorganization means additionally intercouples stages for transferring each bit which was stored in a stage having the designation $(i+Q)(\text{mod } n)$ during the first interval $\tau$ into a stage having the designation $(j+1)(\text{mod } n)$ during the second interval $(\tau+1)$, wherein Q is a constant integer greater than one for each stage of the register.

2. A register in accordance with claim 1 in which:

a reorganization pulse source is coupled to the reorganization means for applying a series of cyclical reorganization pulses, and the reorganization means transfers each bit between stages in response to each reorganization pulse.

3. A register in accordance with claim 2 in which the reorganization means responds to successive reorganization pulses to arrange successive new data sequences wherein a shift span K of each of the successive sequences varies as a power series of Q.

4. A register in accordance with claim 3 in which shifting means intercouples the stages for shifting each bit between adjacent stages in the tandem sequential ring.

5. A register in accordance with claim 4 in which:

a shift pulse source is coupled to the shifting means for applying sets of shift pulses, and the shifting means transfers each bit between adjacent stages in the tandem sequential ring in response to each shift pulse.

6. A register in accordance with claim 5 in which:

the reorganization means comprises a plurality of interstage reorganization paths, and the shifting means comprises a plurality of interstage shift paths.

7. A register in accordance with claim 6 in which:

a reorganization pulse source is coupled to the reorganization means for applying a series of cyclical reorganization pulses to the reorganization means, the reorganization means transfers each bit between stages in response to each reorganization pulse, a shift pulse source is coupled to the shifting means for applying a set of shift pulses to the shifting means, and the shifting means transfers each bit between adjacent stages in the tandem sequential ring in response to each shift pulse.

8. A register in accordance with claim 7 in which:

each stage comprises a bistable circuit having an input and an output, each path of the reorganization means includes a steering circuit coupling one of the outputs to one of the inputs, and each path of the shifting means includes a steering circuit coupling one of the outputs to one of the inputs.

9. A register in accordance with claim 8 in which:

the reorganization pulse source comprises a reorganization pulse gate, the shift pulse source comprises:

a shift set gate for each shift pulse of the set, and a shift count register coupled to each shift set gate, a common control circuit comprises first and second counters, and means couple the common control circuit to each shift set gate and to the reorganization pulse gate for applying control signals.

10. A register in accordance with claim 1 in which the reorganization means comprises $n$ interstage reorganization paths.

11. A register in accordance with claim 10 in which:

shifting means intercouple the stages for shifting each bit between adjacent stages in the tandem sequential ring, and the shifting means comprises $n$ interstage shift paths.

12. A register in accordance with claim 1 in which:

shifting means intercouple the stages for shifting each bit between the stages in the tandem sequential ring, the reorganization means comprise $n$ interstage reorganization paths, and the shifting means comprises more than $n$ interstage shift paths.

13. A register in accordance with claim 12 in which the shifting means comprise an integral multiple of $n$ interstage shift paths.

14. A register in accordance with claim 13 in which:

each stage comprises a bistable circuit having an input and an output, the shifting means comprise:

a first plurality of shift paths, each coupling the output of one stage to the input of another stage in the next adjacent position, and a second plurality of shift paths, each coupling the output of one stage to the input of a stage positioned a predetermined number of positions forward in the register.

15. A register in accordance with claim 1 in which:

shifting means intercouple the stages for shifting each bit between adjacent stages in the tandem sequential ring, the reorganization means comprising more than $n$ interstage paths including primary and secondary interstage reorganization paths, and the shifting means comprise $n$ interstage shift paths, wherein $n$ is an integer.

16. A register in accordance with claim 15 in which:

a reorganization pulse source is coupled to the primary reorganization paths for applying primary pulses to the primary reorganization paths, the reorganization means transfer each bit between stages in response to each primary reorganization pulse, the reorganization pulse source is coupled to the secondary reorganization paths for applying secondary reorganization pulses to the secondary reorganization paths, the reorganization means transfer each bit between stages in response to each secondary reorganization pulse, a shift pulse source is coupled to the shifting means for applying a set of shift pulses to the shifting means, and the shifting means transfer each bit between stages in the tandem sequential ring in response to each shift pulse.

17. A register in accordance with claim 1 in which the reorganization means comprise $n$ primary and $n$ secondary interstage reorganization paths.

18. A register in accordance with claim 17 in which:

a reorganization pulse source is coupled to the primary reorganization paths for applying primary reorganization pulses to the primary reorganization paths, the reorganization means transfer each bit between stages in response to each primary reorganization pulse.

19. A register comprising:

a plurality of stages arranged in a tandem sequence, means coupled to the stages for storing a sequence of data bits in the stages, characterized in that reorganization means coupled to the stages periodically reorganize the sequence of data into a new sequence having a shift span K, and successive new sequences of data each have a different shift span K in accordance with a power series of a reorganization constant Q, wherein Q is a constant integer greater than one.

20. A register in accordance with claim 19 in which:

each stage comprises a bistable circuit having an input and an output, the reorganization means comprise a plurality of reorganization paths, each path including a steering circuit coupling one output to one input, a reorganization pulse source coupled in common to the steering circuits applies reorganization pulses to the steering circuits, and the steering circuits respond to the reorganization pulses for reorganizing the data sequence into the new sequences.

21. A register comprising:

a plurality of $n$ stages arranged in a tandem sequence, wherein $n$ is the number of stages in the register, means coupled to the stages for storing a sequence of data bits in the stages, characterized in that a reorganization means is coupled to the stages for reorganizing the sequence of bits $M_i(\tau), M_{i+1}(\tau) \pmod{n}, \ldots, M_{i+n-1}(\tau) \pmod{n}$ at time $(\tau)$ into plural new sequences of bits, wherein $i$ is an integer and wherein the first new sequence at time $(\tau+1)$ has the form $$M_j^i(\tau+1) \pmod{n},\ M_{j+1}^{i+Q}(\tau+1) \pmod{n},$$

$$M_{j+2}^{i+2Q}(\tau+1) \pmod{n}, \ldots,$$

$$M_{j+n-1}^{i+(n-1)Q}(\tau+1) \pmod{n},$$

wherein $j$ is an integer, the first new sequence of bits having a shift span K, and the new sequences of bits each have a different shift span K in accordance with a power series of a reorganization constant Q, wherein Q is a constant integer greater than one.

the reorganization pulse source is coupled to the secondary reorganization paths for applying secondary reorganization pulses to the secondary reorganization paths, and the reorganization means transfer each bit between stages in response to each secondary reorganization pulse.

References Cited

UNITED STATES PATENTS

| | | | |
|---|---|---|---|
| 3,239,764 | 3/1966 | Verma et al. | 328—37 |
| 3,374,463 | 3/1968 | Muir | 328—37 X |
| 3,374,468 | 3/1968 | Muir | 328—37 X |
| 3,421,092 | 1/1969 | Bower et al. | 307—221 X |

JOHN S. HEYMAN, Primary Examiner

U.S. Cl. X.R.

307—221

UNITED STATES PATENT OFFICE

CERTIFICATE OF CORRECTION

Patent No. 3,496,475 February 17, 1970

Thomas F. Arnold

It is certified that error appears in the above identified patent and that said Letters Patent are hereby corrected as shown below:

Column 10, line 21, the formula should appear as shown below:

$$K=Q^{[\log_Q n]}$$

line 49, "recorganization" should read -- reorganization --. Column 12, line 17, before "exists" insert -- shift span $K=Q^0=1$ exists and during the interval $\tau_5$ when the shift span $K=Q^1=3$ --; line 53, "exists" should read -- exist --. Column 15, line 58, "concering" should read -- concerning --. Column 17, line 21, "date" should read -- data --; line 28, "last" should read -- lasts --; line 43, "O__O" should read -- O-O --; line 75, "when" should read -- When --. Column 18, line 68, cancel "with". Column 20, line 32, before "greater" cancel "of". Column 25, TABLE V. -PART A, the formula in the heading of the right-hand column should read -- $(1+[\log_Q n])$ --; Column 27, TABLE V.-PART B, in the left-hand column of the third from the bottom row, the formula should read $$n-(1+Q+\ldots+Q^{(1+[\log_Q n])})\left(\frac{Q-1}{2}\right)$$

Column 33, line 11, cancel "j", two occurrences; line 33, the formula in the left-hand column of the table should read -- $n-\frac{3Q}{2}$ --. Column 38, line 73, the formula should read -- $\frac{P-(Q^{[\log_Q n]}-1)}{2}$ --. Column 40, line 5, the formula should read $$\left(1+\frac{Q}{2}\right)\left(1+\left[\log_Q\left\{\frac{1-n+nQ}{Q}\right\}\right]\right)$$

line 20, "betwen" should read -- between --; line 67, "essentially" should read -- essential --. Column 45, lines 16 and 17, the entire formula should be read together as $$(Q-1)(1+[\log_Q n])+1$$

line 51, "reorganizatioi" should read -- reorganization --. Column 47, line 69, "reorganizating" should read -- reorganizing --. Column 48, line 12, the formula should read $$K=Q^{[\log_Q n]}$$

Claim 11, line 28, "comprises" should read -- comprise --. Claim 18, line 13, after "pulse" insert a comma and the following two clauses -- the reorganization pulse source is coupled to the secondary reorganization paths for applying secondary reorganization pulses to the secondary reorganization paths, and the reorganization means transfer each bit between stages in response to each secondary reorganization pulse --. Claim 21, lines 21 through 27, cancel in entirety starting with "the reorganization pulse source" and continuing through "secondary reorganization pulse.".

Signed and sealed this 11th day of August 1970.

(SEAL)
Attest:

EDWARD M.FLETCHER, JR.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,496,475 Dated February 17, 1970

Inventor(s) Thomas F. Arnold

It is certified that error appears in the above-identified patent and that said Letters Patent are hereby corrected as shown below:

Column 12, line 26, the formula should read -- $K=Q^{[\log_Q n]}$ --. Column 25, TABLE V.-PART A, in the left-hand column the formula "$(\frac{3Q-1}{2})$", second occurrence from the top, should read -- $(\frac{3Q+1}{2})$ --. Column 25, TABLE V.-PART B, the formula in the heading of the right-hand column should read -- $(1+[\log_Q n])$ --. Column 27, TABLE V.-PART B, the formula in the heading of the right-hand column should read -- $(1+[\log_Q n])$ --. Column 30, line 35, the formula should read -- $(Q^{(1+[\log_Q n])}-1)$ --. Column 33, line 10 of TABLE VI.-PART B, the second column from the left side of the table should read -- --0.0 --.

SIGNED AND SEALED
NOV 17 1970

(SEAL)
Attest:

Edward M. Fletcher, Jr.
Attesting Officer

WILLIAM E. SCHUYLER, JR.
Commissioner of Patents